United States Patent [19]

Heath et al.

[11] Patent Number: 4,845,665

[45] Date of Patent: Jul. 4, 1989

[54] SIMULATION OF COMPUTER PROGRAM EXTERNAL INTERFACES

[75] Inventors: Douglas C. Heath, Marietta; Alan C. Lind, Atlanta; Carol A. Schneier, Marietta, all of Ga.

[73] Assignee: International Business Machines Corp., Armonk, N.Y.

[21] Appl. No.: 769,910

[22] Filed: Aug. 26, 1985

[51] Int. Cl.[4] .............................................. G06F 3/00
[52] U.S. Cl. ..................................... 364/900; 364/300
[58] Field of Search ... 364/900 MS File, 200 MS File, 364/300

[56] References Cited

U.S. PATENT DOCUMENTS

| | | | |
|---|---|---|---|
| 3,716,842 | 2/1973 | Belady et al. | 364/200 |
| 3,810,107 | 5/1974 | Goldman et al. | 364/200 |
| 4,075,695 | 7/1978 | Lelke | 364/200 |
| 4,078,249 | 3/1978 | Lelke et al. | 364/200 |
| 4,574,364 | 3/1986 | Tabata et al. | 364/300 |
| 4,621,319 | 11/1986 | Braun et al. | 364/200 |
| 4,622,633 | 11/1986 | Ceccon et al. | 364/200 |
| 4,700,293 | 10/1987 | Grone | 364/200 |

OTHER PUBLICATIONS

"Software Training Packages", by M. Liardet and J. Sanders, Personal Computing World, vol. 7, No. 5, May 1984, pp. 220-222.
"Making Lotus as Easy as 1-2-3", by M. Heck, Interface Age, vol. 9, No. 3, Mar. 1984, pp. 135-137.
"Screen Director: A Computer-Controlled Slide Presentation Package", by D. Ahl, Small Business Computers, vol. 7, No. 3, May/Jun. 1983, pp. 33-34, 36.
"Hands On Software Tutorials", by R. Carr, Computer Merchandising, vol. 3, No. 5, Oct. 1983, pp. 100, 102, 104–105.
IBM Marketing Brochure GC34-4031-0 for the ISPF/PC (EZ-Vu), Software Package (4/84).
IBM Publication No. GC34-4103-0, Hints and Tips for Using the ISPF/PC (EZ-Vu), Software Package (2/85).

Primary Examiner—Eddie P. Chan
Assistant Examiner—Joseph T. Fitzgerald
Attorney, Agent, or Firm—C. Lamont Whitham; James H. Barksdale; Thomas F. Galvin

[57] ABSTRACT

A method for developing computer program external interfaces by simulating the interfaces to allow intended users to evaluate the design of the program, even before program code for the simulated program is created.

The interfaces are executed as a simulated program. During execution, the interfaces may be altered; execution can then continue using the altered interfaces.

9 Claims, 17 Drawing Sheets

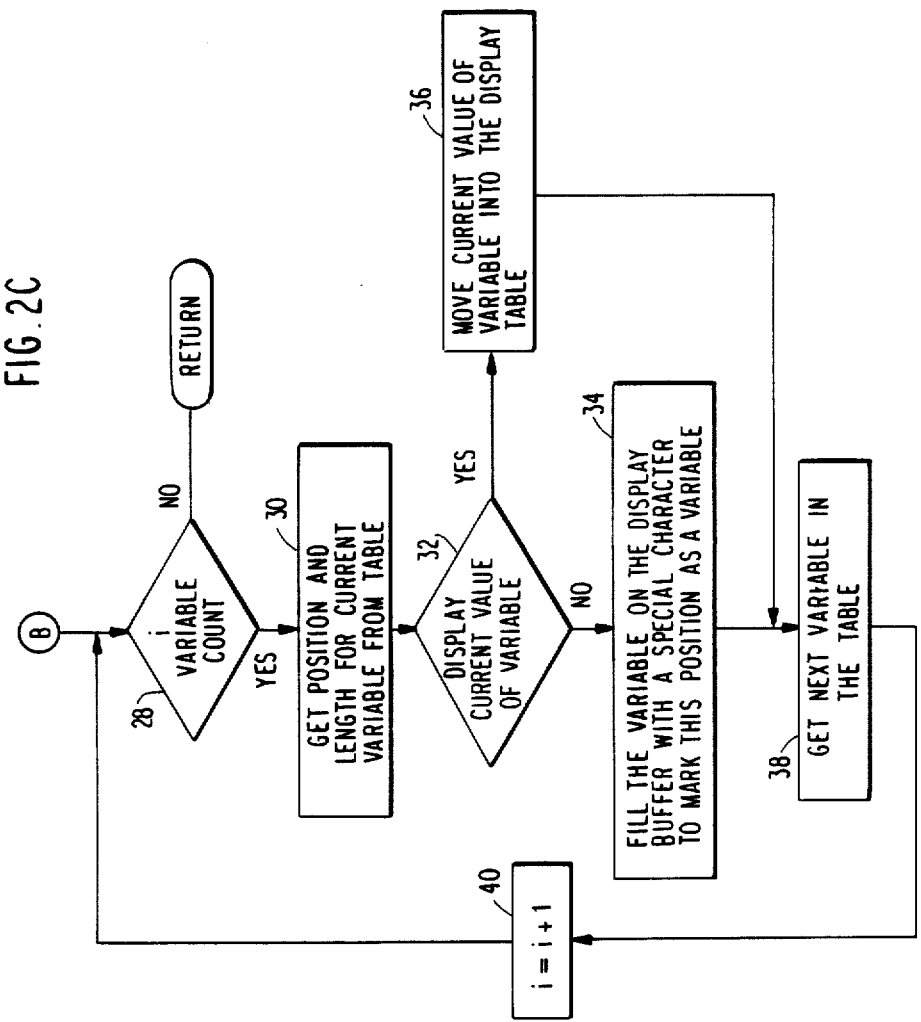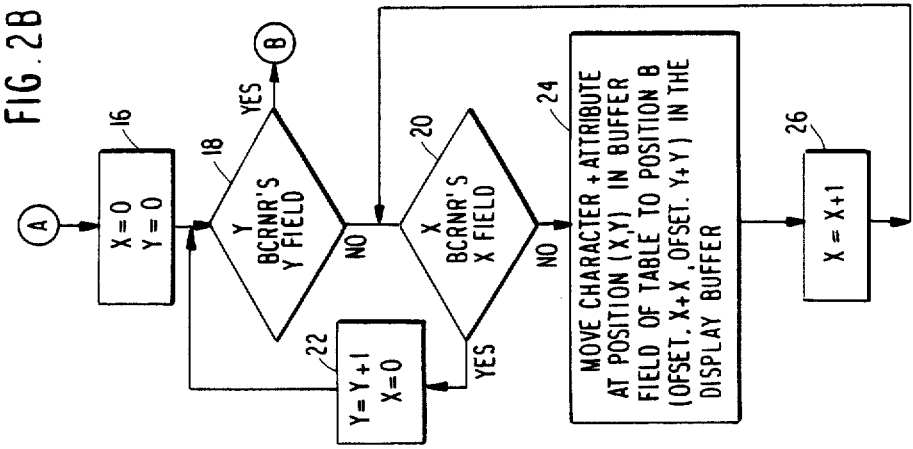

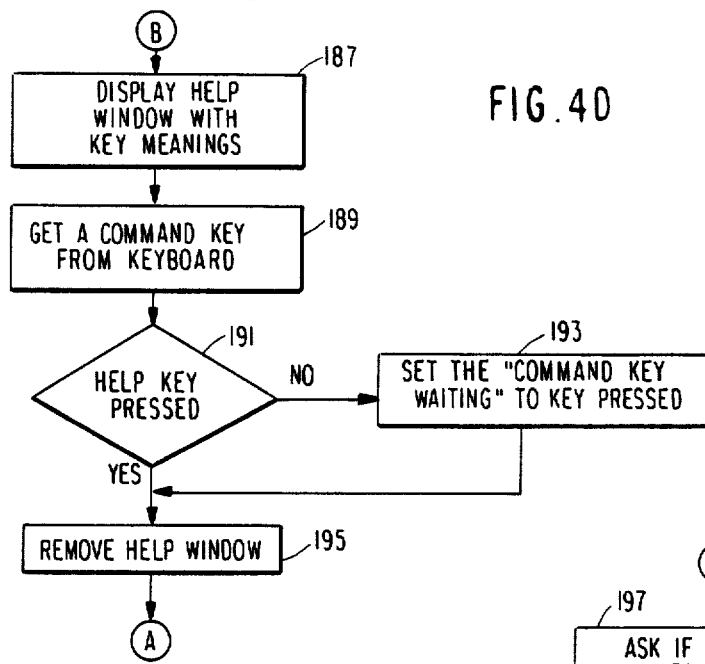
FIG. 4D
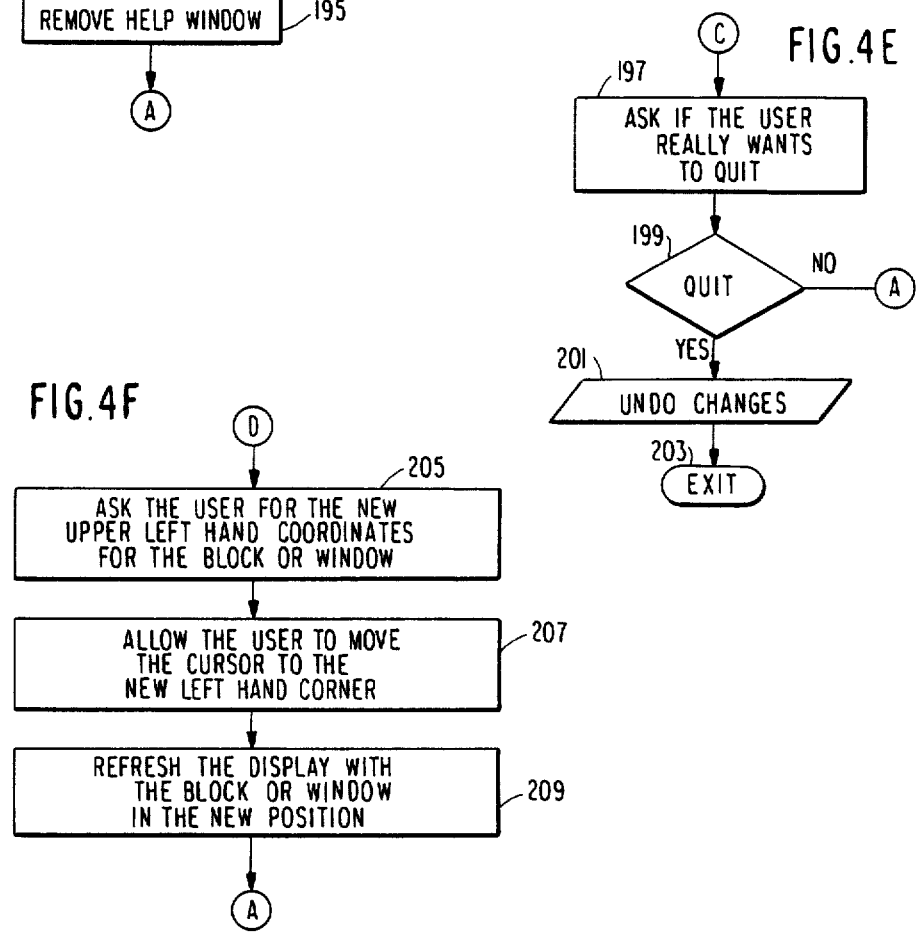
FIG. 4E
FIG. 4F

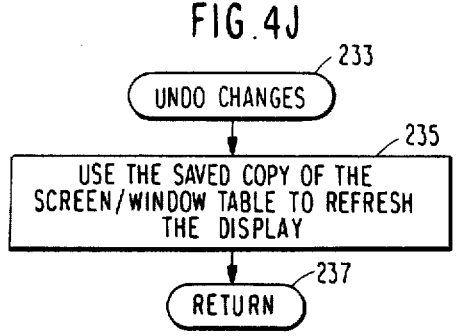
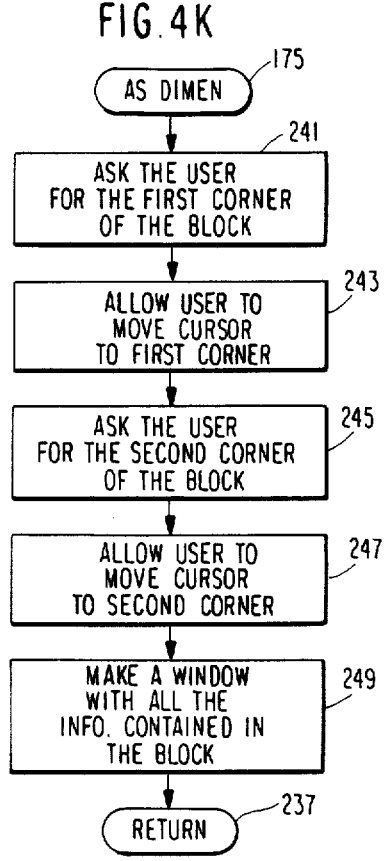
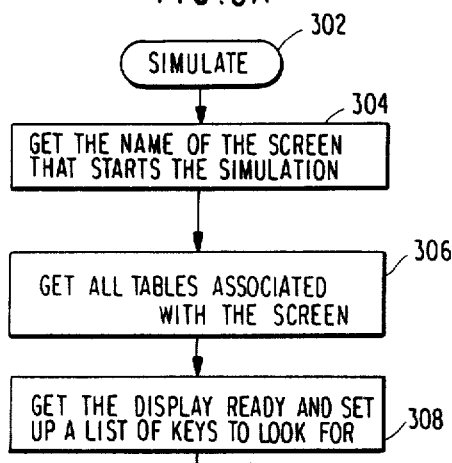
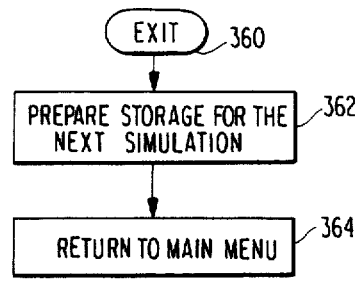

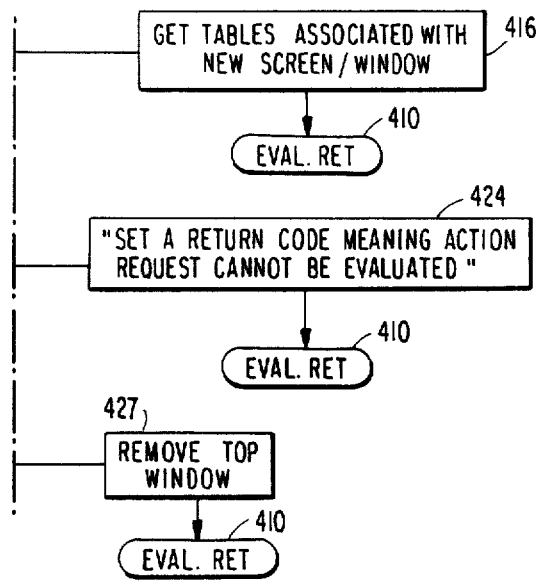
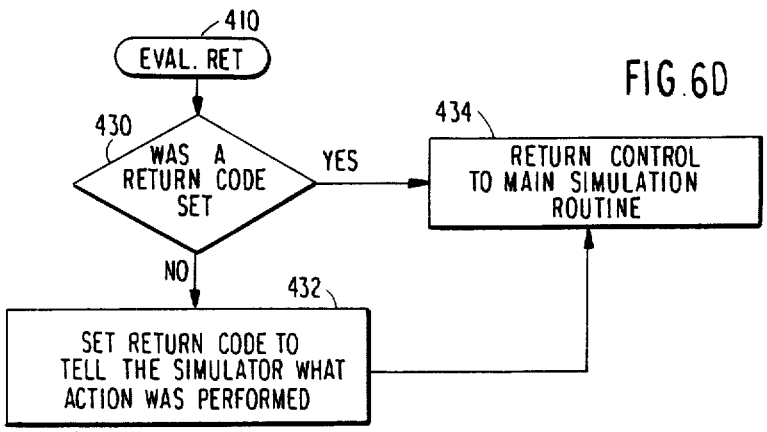
FIG.6C
FIG.6D
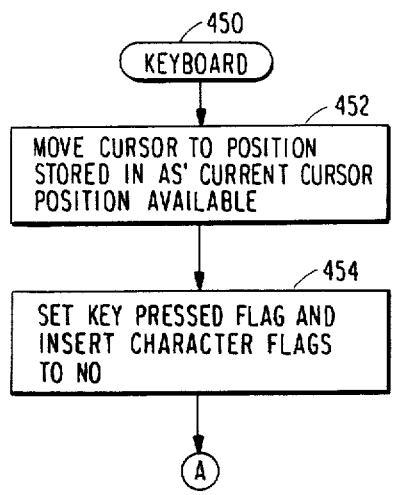
FIG.7A

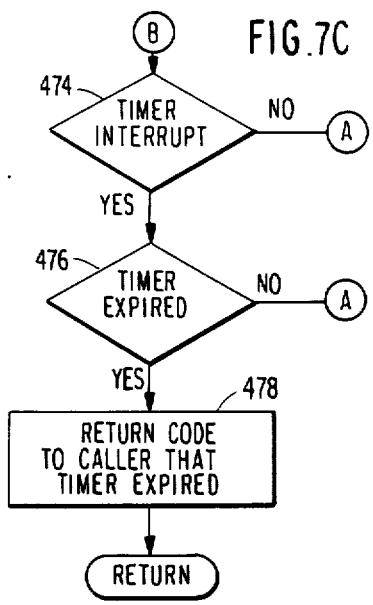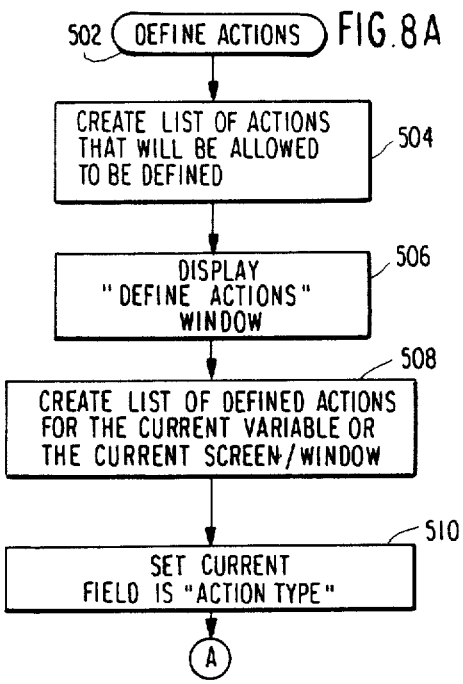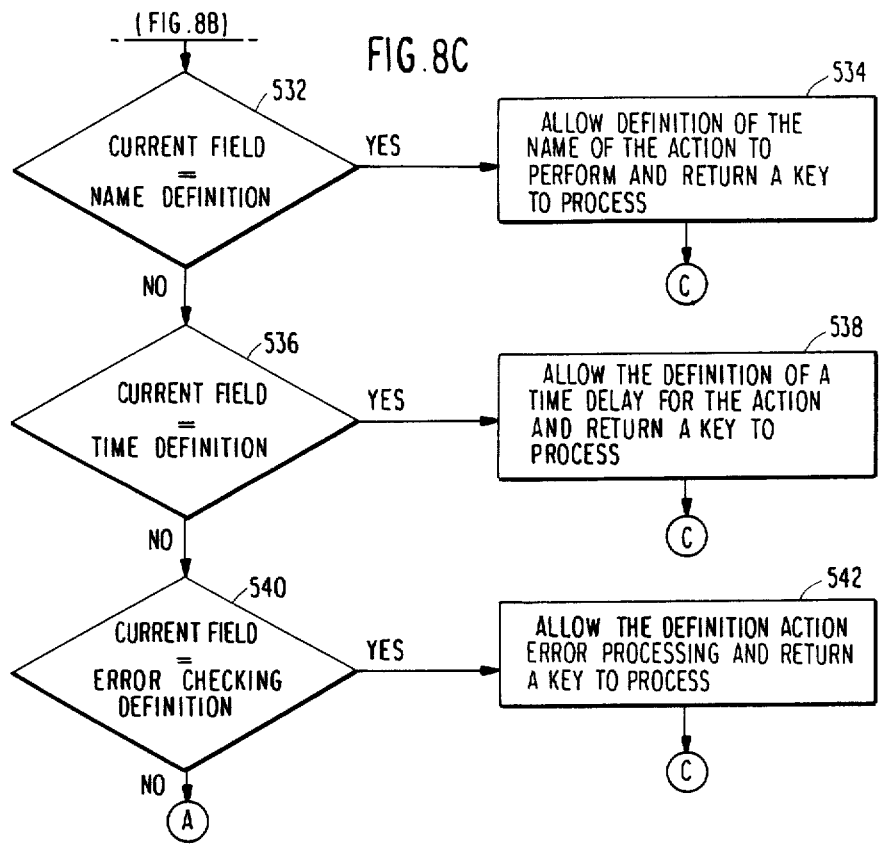

SIMULATION OF COMPUTER PROGRAM EXTERNAL INTERFACES

FIELD OF THE INVENTION

The present invention relates to a method for developing computer program external interfaces. More particularly, the invention relates to a method which simulates the external interfaces of a program to allow intended users to evaluate the design of the program, in most cases before program code for the simulated program is created.

BACKGROUND OF THE INVENTION

In creating computer programs, particularly for use on microcomputers such as personal computers, it is very important to design easy-to-understand display screens and windows (which we refer to collectively as external interfaces, or interfaces). During the operation of the program, most computer programs display information on a video display screen, and the user interacts via a keyboard with the underlying functions of the program by what appears on the display screen. In any given program there are many types of these external interfaces. At a minimum, most successful programs in this field currently contain interfaces consisting of initial instructions, menus, assitance or help screens and windows, lists of various options available to the user, and questions to which the user responds with answers that are passed back to the program.

These external computer interfaces "enable" the underlying program in that they allow the user to utilize the internal functions of the program. The productivity of the user is an important consideration during the design of a computer program. Poor design of these external interfaces can negatively impact the productivity of the user, and it is important for the program designer to make wise choices to minimize user effort.

When the external interfaces are not designed with the level of sophistication of the user in mind, the usesr wastes time and spends additional effort in learning and performing a task and in recovering from the effect of errors made during the task.

To insure that these interfaces meet the needs of the users, the industry has developed techniques for testing software interfaces with representative users and continually redesigning the interfaces for improving the human-computer interfaces. Unfortunately, with current practices, a realistic set of interfaces is generally available only towards the end of the computer program development cycle, when underlying program functions have been developed because a realistic prototype of the interfaces is generally prohibitively expensive. If usability testing uncovers problems with the external interfaces at this stage, correcting them may be difficult without impacting development resources or the development schedule. To be effective, usability testing must be done early enough in the development cycle of the application program to allow iterative design. Unfortunately, usability testing and iterative design are expensive, and it is difficult to do more than a few iterations without impacting the product schedule.

Computer programs are now commercially available for designing such interfaces; and these programs may be used to design such interfaces prior to coding the computer program. As an example, the EZ-VU development facility for the IBM Personal Computer, IBM Personal Computer Software No. 6410980, provides an interface screen design facility as a link between a display screen and the underlying application program. The EZ-VU program helps a programmer to design well-organized interfaces for communication between a user and the program written by the programmer. The EZ-VU type of program has greatly simplified the development and management of the interactive dialog between a program and the user.

Another such program is the IBM 5510 computing system Screen Design Aid, IBM Program No. 5798-NRH, which allows a user to design a screen on the 5110 computer, where it will be used. The Aid then translates the design and field definitions into source code.

A significant feature of these programs and a number of other similar ones which are commercially available is that the screen designed by the programmer is displayed exactly as the user will see it and can be changed to optimize the information on the display.

However, a major drawback of such interface screen design programs becomes apparent after all of the interfaces have been designed by the programmer. When these interfaces are executed as a simulation of a computer program by the programmer or by a user, the design of a particular part of the interface cannot be altered during the execution of the simulated program. This is a significant point because during the usability testing process a typical user often feels it necessary or desirable to rearrange, modify, add or delete some information on the interfaces or to change the relationships among the interfaces in the context of the task the user is attempting to accomplish.

SUMMARY OF THE INVENTION

In view of the background described above, an object of this invention is to simplify the design of the external interfaces of a computer program.

It is a further object of this invention to make it easy and fast to change the information contained in such interfaces and the relationship among the interfaces.

It is a further object of this invention to permit the modification of the design of the interfaces during the execution of the simulated program interfaces.

The present invention concerns a method which enables a user or program developer to simulate the operation of a computer program by designing the external interfaces of the simulated program and to connect the interfaces according to the design of the simulated program. Our inventive method is embodied in a computer program which we call the Application Simulator (AS). In the method of a software planner, designer or programmer designs the program interfaces by defining the appearance of the interfaces and connecting them with logic. No program code is required at this stage (although the program may have already been coded, either partially or fully. In such cases changes would be made to program code.)

The designer can then ask representative users to execute the simulated program by performing typical tasks and noting the users' reactions to the interfaces and the task flow. The designer or user can stop the execution process, change the interface, (e.g. reword a message, move a prompt) and continue the simulation execution with the changed interface. We term this a "dynamic modification facility". This encourages iterative design by allowing the designer to readily change the interfaces or compare alternatives suggested by the user. Thus, external interfaces may be realistically simulated at the time the initial design specification is written, typically well before the first line of program code for the simulated program is written.

Interfaces are defined by typing on a blank display device or changing an existing interface. The designer types the screen exactly as he would like to see it. Variables are defined to hook the screens together. During the execution of the simulation, as a user enters a value in a variable field, the appropriate interface is displayed. Error messages, and the conditions that caused their display may also be associated with each screen and variable. In this way there is an illusion of executing an operative program even though even though no underlying program code for the simulated program exists.

During the process of executing the simulated program the user, by using the dynamic modification facility, can stop and change something on the screen or window and then continue. There is no necessity to recompile the simulation program and begin anew.

BRIEF DESCRIPTION OF THE DRAWINGS

The foregoing and other objects, advantages and aspects of our invention will be better understood from the following detailed description of the invention with reference to the drawings in which:

FIGS. 2A to 2C, taken together, are a flow diagram of a routine for creating a display of an interface (screens/window);

FIGS. 4A to 4K, taken together, are a flow diagram of the Dynamic Modification routine which allows a user to change the design of an interface while simulating an application program;

FIGS. 5A to 5E, taken together, are a flow diagram of a Simulation routine, which is the method for simulating the execution of a simulated program;

FIGS. 6A to 6D, taken together, are a flow diagram of the Evaluate Action (or Execute Action) routine which performs actions passed to it by the Simulation routine illustrated in FIG. 5;

FIGS. 7A to 7C, taken together, are a flow diagram of the Keyboard routine which is responsive to information typed by the user on the keyboard associated with the computer;

FIGS. 8A to 8E, taken together, are a flow diagram of the Define Actions routine whereby the simulation author defines the actions which the simulation routine may execute during execution of the simulated program.

DESCRIPTION OF THE PREFERRED EMBODIMENT

Figure 1:
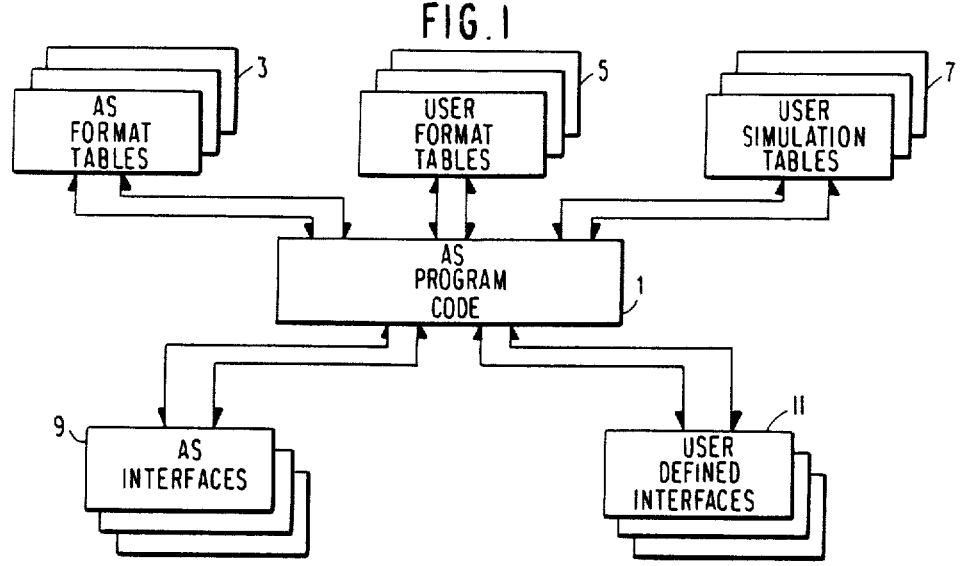
FIG. 1 shows the interaction of the AS program code according to the invention with the tables stored in the memory of a computer and the interfaces which appear to the user on a display.

In the preferred embodiment of our invention, the simulation runs on the International Business Machines Corporation PC/XT Computer and uses the fixed disk of the XT computer to hold information about variable fields that are needed during the simulation process. The preferred operating system program is the IBM PC DOS Version 2.0. Both the computer and the operating system are commercially available and their functions form no part of the present invention. To fully exercise the functions of the preferred embodiment of the present invention, the PC/XT computer should have at least 512K bytes of storage and at least 2 megabytes available on the fixed disks.

In the following decription an author is generally considered to be a program designer and a user is considered to be a program designer and a user is considered to be a person representative of an end user of the program which is being simulated prior to complete coding. However, it should be understood that a user might also design a program using AS and that a program designer might be an end-user.

As a means of more succinctly describing the operation of the simulation process, it will be helpful to define and describe the components of the simulation process. It is recognized that these descriptions will be well known to those of ordinary skill in the programming art; however, certain terms have different meanings to different programmers, particularly when a term is applied to different types of programs.

Basically, there are five different simulation components which are defined and used to simulate the external interfaces of an interactive application program: screens, windows, variables, constants, and messages. A screen is a matrix of characters, typically 1920 characters (24×80) of information that is displayed on the video monitor during a simulation. A screen contains both constant and variable information; the former does not change when different copies of a screen are displayed; the latter can change when different copies are displayed. A screen format describes the location of the constant and variable information on the screen and also the constant information itself. Each unique copy of a screen format, which generally contains different variable information, is termed a simulation screen. A simulation screen can be logically connected to another simulation screen or another simulation component such that, by entering a command through a keyboard, a screen can be replaced by another component on the display unit and vice versa. Each screen format and simulation screen is given a unique name, typically from one to eight characters long.

A window is a rectangular subset of screen which amy vary in size from one character to 1920 characters. Typically windows overlay a screen. Removing a window uncovers part of the screen under it. Windows can also be placed on top of other windows. A simulation window and window format have the same relation as a simulation screen and a screen format. A display attribute is a particular property that is assigned to all or part of a screen, for example, high intensity, reverse video, underlining, flashing, red color.

DESIGN OF THE APPLICATION SIMULATOR

In the overall design of the application simulator (AS) according to the present invention, all information supplied by the user is stored in tables in memory used by AS to run a simulation. For instance, when a user is describing a screen, he types information on the display exactly the way he wants the screen to look. After he saves the screen, AS takes the information on the display and converts it into a table. If the user wants to see that screen again, AS will convert the table back into a screen image.

A simulation may be described by five tables: Format, Simulation, Variable, Message and Check Point.

A Format table describes how an interface (screen/window) looks. Format tables are used not only by the simulated application, but also by the AS program to prompt the user when he is describing the simulation. In each table constant information and its attributes are stored relative to the upper left corner of the screen/window. Variable information is stored as a list of records for each variable defined for the screen/window. They contain:

1. The variable's name, length, and position relative to the upper left corner of the screen/window.

2. The Attribute of the text placed in the variable as well as the attribute of the text if the value in the variable does not meet the conditions defined by the person designing the simulation.

3. Justification of the text when displayed—none, left, right or center.

4. Case of the text when displayed—upper, lower or mixed.

5. Type of the value and how the value can change during simulation:

Input/Output—display any previous value and allow a new value to be typed while running the simulation.

Input—do not display the previous value, but allow a new value to be typed while running the simulation.

Output—display any previous value, but do not allow a new value to be typed while running the simulation.

Message—display only a message in the variable and do not allow any other value to be given to the variable.

6. Edit type of the value—Numeric, Alphabetic, Alphanumeric.

7. Range of the value in the variable—Edit Type and Range controls the value of the variable. During simulation AS checks the value of the current variable and if it does not meet the conditions given, AS executes an error action.

A Simulation table controls the simulation. It describes what actions the simulation user can take when a particular screen/window is displayed and what values to place in the variables of a particular screen/window.

When the simulation author decribes a simulation table, he relates the table to a screen/window format table. Thus, the author can create one screen/window format table to support many similar looking screens/windows. If one makes a change in the appearance of a screen/window format, each simulation screen/window using the format will reflect the change. A Simulation table contains the following information:

1. A variable record list containing:
  a. variable length for finding a value in value list.
  b. index of the first action record of all the actions for the variable caused by the simulation user pressing a key.
  c. index of the first action record of all the actions for the variable that occur automatically.
  d. index of the first action record of all the actions for the variable that are caused by a timer expiring.
  e. index of the first action record of all the actions that are performed when an error is found in the value of the variable.
  f. index of the value to place in the variable.
  g. variable name associated with the record.
2. An action record list containing:
  a. type of action.
  b. index of the record in the key list with the keys associated with the action record.
  c. index to the next action record in the list.
  d. index into the acceptable value list in the global variable record for the value that must be in the variable for the action to be evaluated.
  e. time—the time to delay for key or automatic actions and to set the timer for time out actions.
  f. a flag indicating whether to perform the action if an error is found in the current variable during simulation.
  g. name of the target of the action: Screen, Window, Variable, Message or Report.
3. An active key list—each entry in the list is a bit map. If a bit is "on", the key associated with the bit is active.
4. A value list—the values in this list are used to replace the current variable value when the screen/window is displayed during simulation.
5. A format table name associated with the simulation table.
6. An index of the first action record of all the actions available to the entire screen/window caused by the user pressing a key, another of all the actions for the entire screen/window that occur automatically and another of all the actions for the entire screen/window that are caused by a timer expiring.

The Variable tables contain the global variable information about each variable defined for all screen/window formats. This information is the name, length, current value and acceptable values of the variable.

Acceptable Values like Edit Type and Range in the local variable record helps the simulation control the value of the variable during simulation. Also the acceptable values are used when an action needs a specific value in the variable to be performed during simulation.

The Variable tables consist of a file with all the global variable records defined in a simulation and a file with the indices of all the variables in the simulation. The global record file is just one record after another in the order they were defined. The index file uses a common database indexing technique known as B-Trees.

THe Message tables contain the text of all messages used during simulation. Like the variable tables, the message tables have the file with the text of each message and the index file with the names of all the messages.

The Check Point table contains information needed about the state of the variable and message tables. It tells the AS program which record in the index files is the root node of the B-Tree, and what is the next available record in the two index files and in the variable and message record file.

Turning now to the drawings, FIG. 1 shows the interrelationship among the tables stored in memory, interfaces (screens/windows) on the user's display and the AS computer program. The AS format tables 3, user format tables 5 and user simulation tables 7 are stored in the memory of the computer. The AS interfaces 9 and the user defined interfaces 11 are displayed to the user during the creation and editing of the information on the display screen and during the execution of the simulated program.

The user creates and executes a simulated program with AS in four stages: (1) defining the interfaces and the information contained therein; (2) defining actions which logically interconnect the interfaces to create an initial simulated program; (3) executing the simulated program by starting with any selected screen and using the previously defined actions, such as pressing a key, to cause related screens to be displayed; and (4) making changes on any of the simulated interfaces without interrupting the execution of the simulated program.

This process will be described by an example which simulates an application for creating and retrieving information about various states of the U.S.

Screen 1 is the first screen which appears to the user upon invocation of the AS program. The main menu is the start and end point for the program. When the user moves the cursor to the desired task and presses the Enter key, he is transferred to the section of the AS program that controls the selected task.

---

Application Simulator
Main Menu
Choose a task:
1  Edit a Screen Format
2  Edit a Simulation Screen
3  Edit a Window Format
4  Edit a Simulation Window
5  Edit a Message
P  Print a Simulated Report
S  Simulate an Application
L  Leave AS
For Help, move the cursor to a task and press F1.

---

SCREEN 1

Figure 2A:
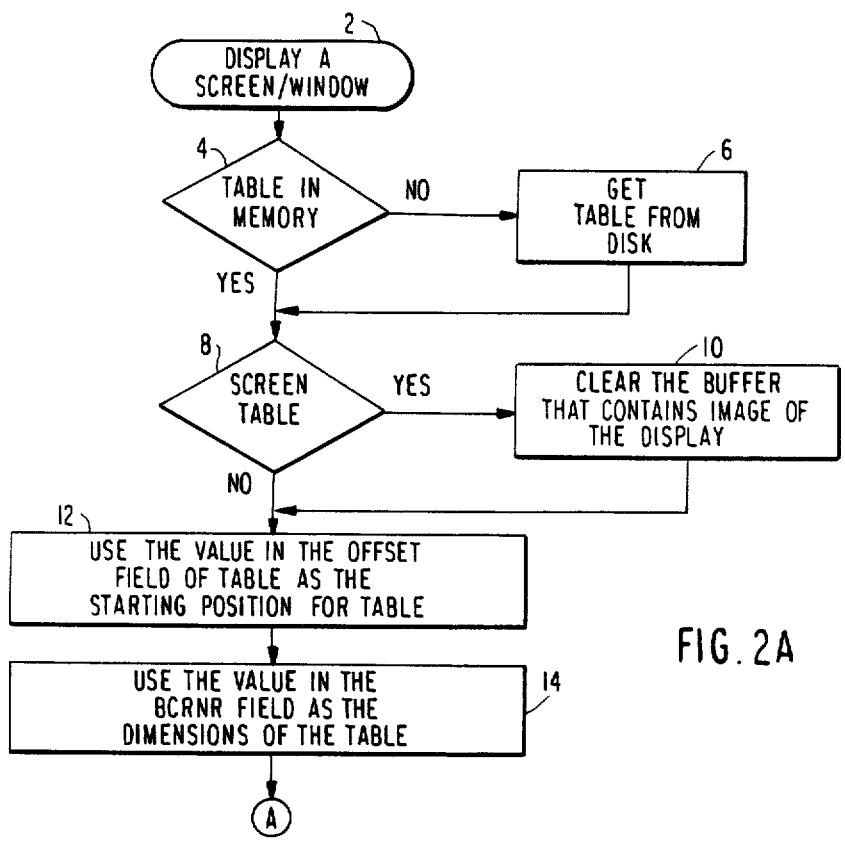

The flow chart of FIGS. 2A to 2C set out a sequence of steps involved in carrying out an embodiment of the method used by AS to enable the user to display a screen or a window in accordance with the present invention. It is a routine called "Display Screen/Window" and is called when the user selects any of the tasks listed on the Main Menu.

In the figures, the customary symbols of a rectangle for representing an operation step and a diamond for representing a decision step have been used, and for convenience of description both will be referred to as blocks. In the case of a decision block, Yes represents a true and No represents a false answer to the question posed.

In FIGS. 2A-2C the AS simulator of our invention uses the format tables to display screens or windows, which is the function shown in block 2. Decision block 4 checks to see if there is a table of the screen or window available in the random access memory of the computer. If the answer is no, a table is obtained from the disk storage of the computer as shown in block 6. Decision block 8 checks whether the table is a screen table. If the answer is yes, the buffer memory which contains the image of the display is cleared as shown in blcok 10. In either case, the value in the OFSET field at the table is used as a starting position for the table as shown in block 12 and the value in the BCRNR field of the table is used at the value of the dimensions of the table as shown in block 14. OFSET is the field within the format tables which specify the starting position of the screen or window. BCRNR specifies the dimensions of the screen or window. In the preferred embodiment of our invention, the value of OFSET is always 0,0 and the value of BCRNR is always 23,79, i.e., the number of rows and columns in a standard display screen.

In block 16 (FIG. 2B) the loop controls for the working variables are initialized at X=0, Y=0, where X is the column number and Y is the row number of the table. In Decision block 18 a test is performed as to whether Y is greater than the Y field of BCRNR. If the answer is no, a test is performed as to whether the X value is greater than the X field of BCRNR as shown in decision block 20. If the answer is yes, Y is set at Y+1 with X remaining equal to zero as shown in block 22. In this loop the program moves to the next row, first column of that row.

If the X value is less than or equal to the X field of BCRNR, the answer from decision block 20 is no, and the character and attribute at position (X,Y) in the buffer field of the table is moved to the position (OFSET.X+X,OFSET.Y+Y) in the display buffer as shown in block 24. The value for X is then incremented by one as shown in block 26 and the process returns to block 20 to again check whether X is greater than the X field.

When the value of Y is greater than the Y field of BCRNR, the processing sequence goes to at block 28 (FIG. 2C) and a check is made as to whether the value i is less than or equal to the variable count, where the value i stands for current variable record. If the answer is Yes, then the position and length of the current variable is obtained from the table, as shown in block 30 and a decision is made as to whether this is a display of the current value of the variable as shown in decision block 32. If the answer is yes, the current value of the variable is moved into the display buffer as shown in block 36, and the next variable in the table is obtained as shown in block 38 and the value i is incremented by one as shown in block 40. If the answer is no, the variable on the display buffer is filled with a special character to mark this position as a variable as shown in block 34. When displayed on the display screen, this character is a light cross hatching. The routine continues this loop until i is greater than the variable count, at which point the routine returns and the entire screen or window is displayed to the user on the display.

Figure 3A:
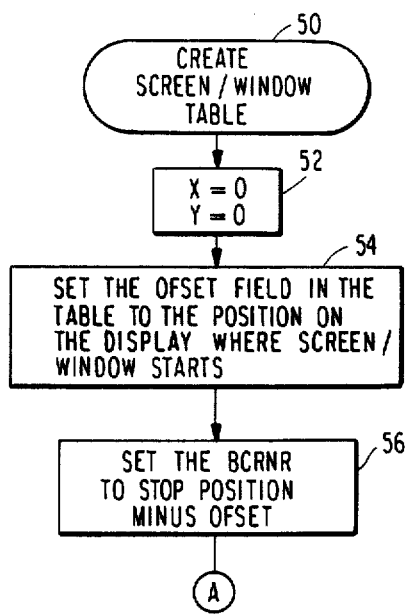
FIGS. 3A and 3B, taken together, are a flow diagram of a routine for creating a screen/window table which is stored in memory.
Figure 3B:
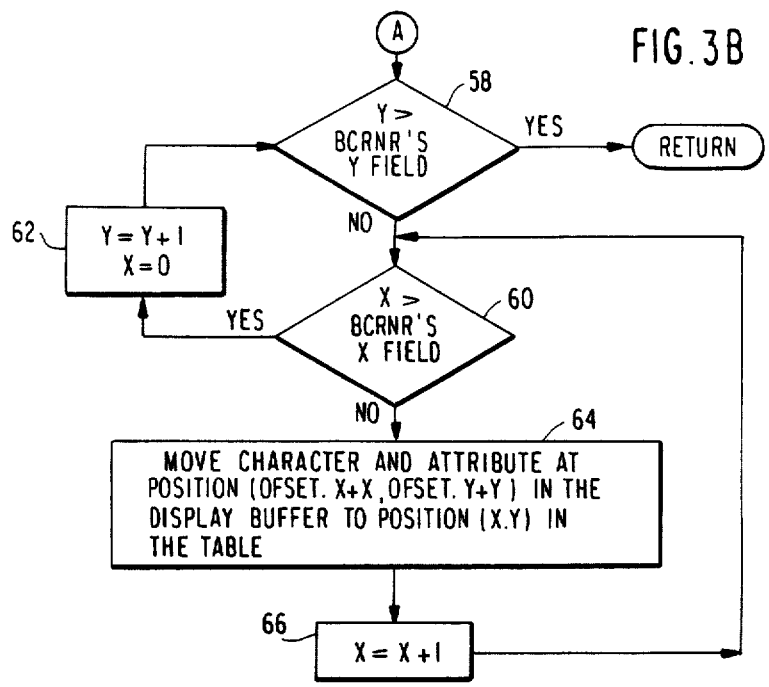

FIGS. 3A and 3B are flow diagrams on the use of the display buffer to enable a user to create a new table of a screen or window. This Display Screen/Window routine operates after the user has selected any of tasks 1 through 5 of the Main Menu. All of the information about the variable is placed in the table when each variable is defined by the user. Initially, the position values X and Y are set equal to zero as shown in block 52 and the OFSET field in the table is set to the position on the display where the screen or window starts as shown in block 54. The values for BCRNR are set to the stop position and minus the value of OFSET. At this point the screen or window may be, for example, in the lower right hand quadrant of the display at positions 12,40.

The user then enters a character into that position and a test is made as to whether Y is greater than the value of the Y field of BCRNR as shown in decision block 58 and whether X is greater than the value of the X field of BCRNR as shown in block 60. If both answers are no, the character and attribute at the position OFSET.X+X and OFSET.Y+Y in the display buffer is moved to position (X,Y) in the BUFFR field and the table. The value X is then incremented as shown in block 66 and the process continues until both values Y and X are greater than the positions available in the table. At this point a complete screen or window table has been created by the user containing all of the variables which have been defined.

The routines described with respect to FIGS. 2A to 2C and 3A and 3B are used in creating the interfaces. A single screen or window in a simulated application is defined by the user to the AS program in two steps. First, a screen format is defined, followed by a particular copy or copies of a simulation screen. The user first selects the task "Edit a Screen Format" from the Main Menu (Screen 1). The user is then asked by AS for the screen format name. In this case the user creates the name STATEFMT (standing for State Format). After pressing the Enter key, a blank screen appears and the user types in the constant information which would be used in one or a number of similar screens. In the example shown below in Screen 3, the format is information about a state of the U.S. It can be used to create a number of screens related to different states. For clarity the constant information is shown as underlined, although in practice the constant information might also appear as a different color. After creating the screen format of constant information only, the user presses a key, e.g., F3, to save the screen format.

| STATE INFORMATION | |
|---|---|
| Name: | |
| Abbreviation: | |
| Capitol: | |
| Population: | |
| Area: | Sq. Miles |
| Counties: | |
| F1-Help | F2-Return |

SCREEN 3

For each constant, the user then creates a definition for each variable, including the name of the variable, its position on the screen in terms of row, column and its length in terms of number of characters. For example, the variable information (i.e., particular states) relating to the constant "name" is given the variable name VNAME having a beginning position at row 15, column 17 and a length of 11 characters. Similarly, abbreviations for the states are given the variable name VABB.

| STATE INFORMATION | | Variable Name | Row, Column | Length |
|---|---|---|---|---|
| Name: | ///////// | ← VNAME | 5,17 | 11 |
| Abbreviation: | /// | ← VABB | 7,17 | 2 |
| Capital: | ////////////// | ← VCAP | 9,17 | 14 |
| Population: | //////// | ← VPOP | 11,17 | 8 |
| Area: | /////// | ← VAREA | 13,17 | 6 |
| Counties: | //// | ← VCO | 15,17 | 3 |
| F1-Help | F2-Return | | | |

SCREEN 4

In operation, the status line on the display says "Screen Format". The user presses a preselected key, e.g., F8, to define variables. A message asks for the name of the variable. For each variable, the user types the variable name he selects and presses the Enter key. A messge asks for the beginning position. The user moves the cursor to the beginning position of the variable on the screen and presses the Enter key. He may define the length by moving the cursor to the end of the variable on the screen and press the Enter key or by typing the length of the variable and pressing the Enter key. The variable appears in light cross-hatching on Screen 4 as shown. The steps are repeated for each variable and then saved by pressing a preselected key. e.g. F3, to save the screen format as STATEFMT.

The attributes and other characteristics (justification, case, type and acceptable values) may be chosen by the user in a process for Editing Variables. In operation, the status line says "Screen Format". The user presses F8 to edit variables and the status line says "Edit Variables". For each variable to be edited the user presses a predetermined key, e.g., F5, to set variable charateristics. A list appears showing all variables defined for STATEFMT. The user chooses a particular variable by placing the cursor under it and pressing the Enter key. In screen 5, the variable is VNAME. An AS interface "Set Variable Characteristics" appears as illustrated in Screen 5. The user may change the characteristics as desired and save the screen format by pressing F3.

| SET VARIABLE CHARACTERISTICS | | |
|---|---|---|
| Name → VNAME | | R,C → 5,17 |
| Length → 15 | | |
| Attribute | → | Lt Grey |
| Error Attribute | → | Lt Grey |
| Justification | → | Left |
| Case | → | Mixed |
| Type | → | Input/Output |
| Edit Type | → | Alphabetic |
| Range →No range set | | |
| Acceptable values | → | 4 defined |

SCREEN 5

It should be understood that the process of changing characteristics and attributes of variables or constant information on display screens is well known to those of skill in the programming art and forms no part of the present invention.

The user is now ready to enter variable information for a number of simulation screens in accordance with the screen format, STATEFMT. The user selects task 2 "Edit a Simulation Screen" from the main menu. After a prompt from AS he types in a simulation screen name, e.g., STATEGA. After pressing the ENTER key, the screen format appears with the constant information as shown in Screen 3. The user then types in the variable information which, as shown on Screen 6, is information relating to Georgia.

| STATE INFORMATION | |
|---|---|
| Name: Georgia | |
| Abbreviation: GA | |
| Capitol: Atlanta | |
| Population: 4587930 | |
| Area: 58560 Sq. Miles | |
| Counties: 158 | |
| F1-Help | F2-Return |

SCREEN 6

After all values have been entered and the simulation screen saved by the user, the steps may be repeated for as many states as desired so that each state information screen has the appropriate information for that state.

In the next step of your example, the user creates a selection screen to be used to call each of the state information screens. This is accomplished by the same two-step process—first creating a screen format for a selection screen, and then a simulation screen.

The VABB variable defined earlier is used to act as a switch on the selection screen to call the correct state information screen.

The user first creates a new screen format, called STATE1, as shown in Screen 7.

---
View State Information
Enter the abbreviation of the State ///
F1-Help    F2-Return

---

SCREEN 7

The format contains the variable VABB at the location indicated by the // marks. The variable and its length and characteristics have been defined previously (Screen 4 above).

In our preferred embodiment, users take actions from simulation screens. To use this selection screen to switch to the four state information screens, the user creates a simulation screen for it, also called STATE1 based on screen format STATE1. The user edits this screen to add the actions connecting it to the other four simulation screens (STATEGA, STATEFL, STATEAL, STATETN) representing the states of Georgia, Florida, Alabama and Tennessee.

In the next step in the creation of the simulated program, the user defines the actions which logically interconnect the interfaces to create an initial simulated program. This is accomplished by means of a "Define Action" routine which is discussed hereinafter with respect to the flow diagram of FIGS. 8A to 8E. A more general description is given at this point.

An "action" is a step specified by the user which is to be taken by the AS program when the user executes (runs) the simulated program. An example of an action is the pressing of a key which causes the effect of transferring from one screen to another. In our terminology, the effect is also called the "Target of the Action". The user specifies actions so that the simulation screens which he has created are logically connected as a set. The AS program will take an action based on the value entered by the user in a variable field plus a key available on the keyboard.

When the user desires to define actions, he selects the task "Edit a Simulation Screen" and moves the cursor on the display to the variable block desired. He then presses a specified key, for example, F8, to define the actions. Screen 8, an AS interface termed a "Define Actions" window, then appears having only the constant information which is shown by underlining.

The cursor moves to the first action on the screen which is Cause, which may consist of a value entered in a variable (e.g., a Variable VABB) or a key (e.g., F2), or it may be a value plus a key, as selected by the user. The user then enters the value and the particular key he chooses which will cause an Effect, for example, "transfer to another screen". The user may also specify a time value which may be the time to wait before interrupting the simulation program to execute an action or how much time to delay before executing the action. The error checking field is used to determine the appropriate action in case of error.

In the preferred embodiment of our invention, the following effects of an action are permitted by the AS program: no action, move cursor to another variable, transfer to another screen, overlay a window, replace the present window with another window, return to AS main menu, remove the present window, display a message, rotate forward or backward or through values, printer report, scroll the present window up or down one page and scroll the present window up or down one line. These choices are made available to the user by allowing him to use the PgUp key to rotate through the choices or to press a key, e.g. F6, to display a window of choices. When the selected choice appears, the user may enter the choice.

In the illustrated example shown in Screen 7, the value in variable VABB plus pressing the Enter key causes the simulation screen STATE1 to display the appropriate state information simulation screens (STATEAL, ..., STATETN).

---
| Actions for variable VABB | | | |
|---|---|---|---|
| Cause → | Value + Key | Value → AL | Key → |
| Effect → | Transfer to another screen | Screen name → STATEAL | |
| Time → | 0 seconds | Error checking → | Yes |
| Cause → | Value + Key | Value → FL | Key → |
| Effect → | Transfer to another screen | Screen name → STATEFL | |
| Time → | 0 seconds | Error checking → | Yes |
| Cause → | Value + Key | Value → GA | Key → |
| Effect → | Transfer to another screen | Screen name → STATEGA | |
| Time → | 0 seconds | Error checking → | Yes |
| Cause → | Value + Key | Value → TN | Key → |
| Effect → | Transfer to another screen | Screen name → STATETN | |
| Time → | 0 seconds | Error checking → | Yes |
| Cause → | Key | Key → | |
| Effect → | No action | | |
| Time → | 0 seconds | Error checking → | No |
| Simulation Screen | Format → STATE1 | Variable → ABB | |
| STATE 1 | | | |

---

SCREEN 8

In substantially the same way as the user created actions for variables, he may also create actions for screens which simulate function keys. For example, the user may specify that pressing key F2 will cause a transfer from one screen to another; pressing key F1 would cause the overlay on a particular screen of a Help window.

In the illustrated example, the user specifies to the AS program which function key the user presses to return from each of the four state information simulation screens to the STATE1 simulation screen, and from STATE1 back to AS. In operation, the user again selects the task "Edit a Simulation Screen". He then presses a predetermined key, e.g., F7, and a window appears with the same entries used to define variable actions in Screen 7.

Similar to variable actions, each entry defines one action to AS. The user indicates to AS what causes the action (in this case, a key), and what effect the action should have. In the example the user selects pressing the F2 key to return from STATE1 to AS (ending the execution of the simulated program). He also selects the F2 key to transfer from any state information screen to STATE1.

At this point the user is ready to execute the simulated program. In the simple example previously described, the user has created five simulation screens STATE1, STATEGA, STATEAL, STATEFL and STATETN. In addition, the user has defined two types of actions: the variable VABB causes the selection screen STATE1 to switch to the appropriate STATE simulation screen when user enters AL, SL, GA or TN in that variable field and a screen action which cause the STATE information screens to return to STATE1 and for STATE1 to return to AS.

In operation, the user accesses the Simulate Routine by choosing option S from the AS menu. This displays a prompt asking the user for the name of the screen which starts the simulation, e.g., STATE1. The user then executes the program. The Simulation routine in AS is described more fully with respect to the flow chart in FIG. 5, to be discussed hereinafter.

In executing the simulated program the user may make modifications by a process called Dynamic Modification. The Dynamic Modification portion of the AS program is an important part of our invention. It allows the user to change information on a screen or window while running a simulated program without having to leave the simulated program, make the change and start the program over again. The method of executing the simulated program is discussed more fully hereinafter with respect to FIGS. 5A to 5E.

In the preferred embodiment of our invention, the user may make the following modifications dynamically by key action: move a block of information or a window on the display, change the attributes of the block, or change the wording in a block.

The Dynamic Modification Routine is illustrated in FIGS. 4A to 4K. At its initiation at block 151 (FIG. 4A) the user is working with a screen during the simulation process and presses predetermined keys, such as ALT +F9 to begin dynamic modification. The AS program then refreshes the display with the current screen in any or all windows within the screen at 153. The program also obtains some storage for working with the screen window and tables and puts aside a copy of the current screen window table in memory at 157.

Figure 4A:
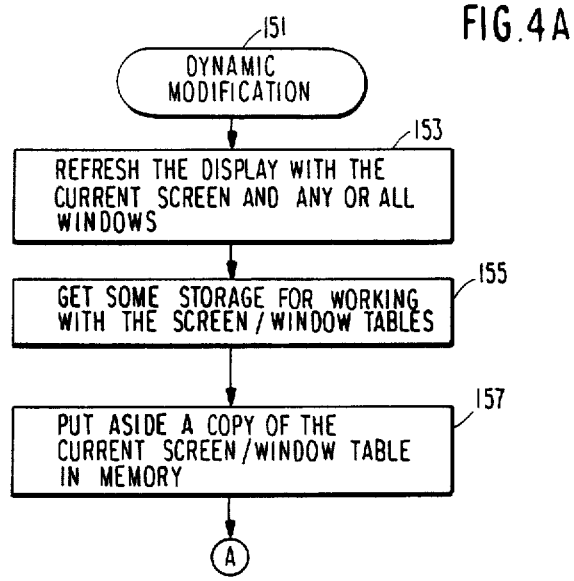
Figure 4C:
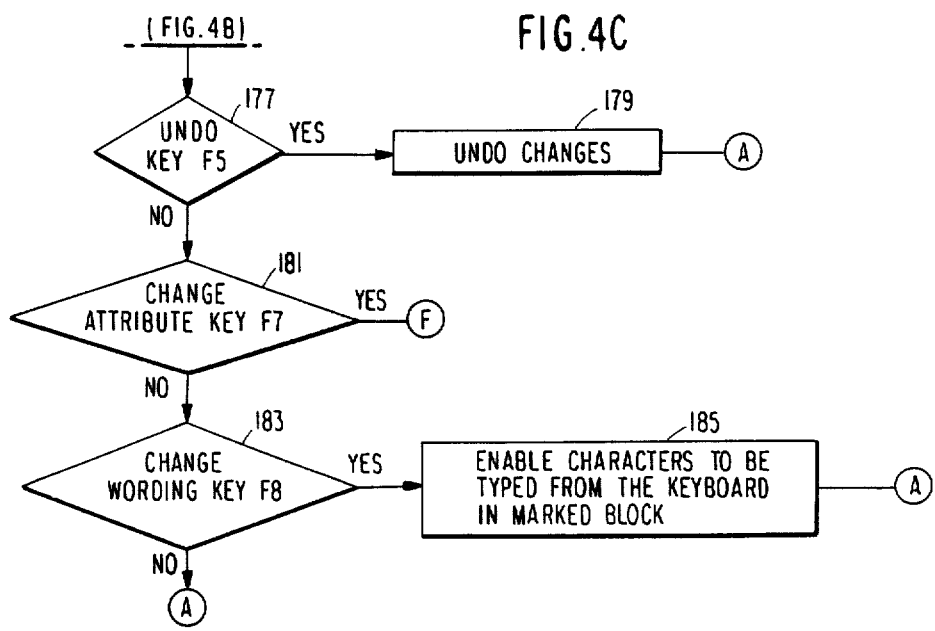
Figure 4B:
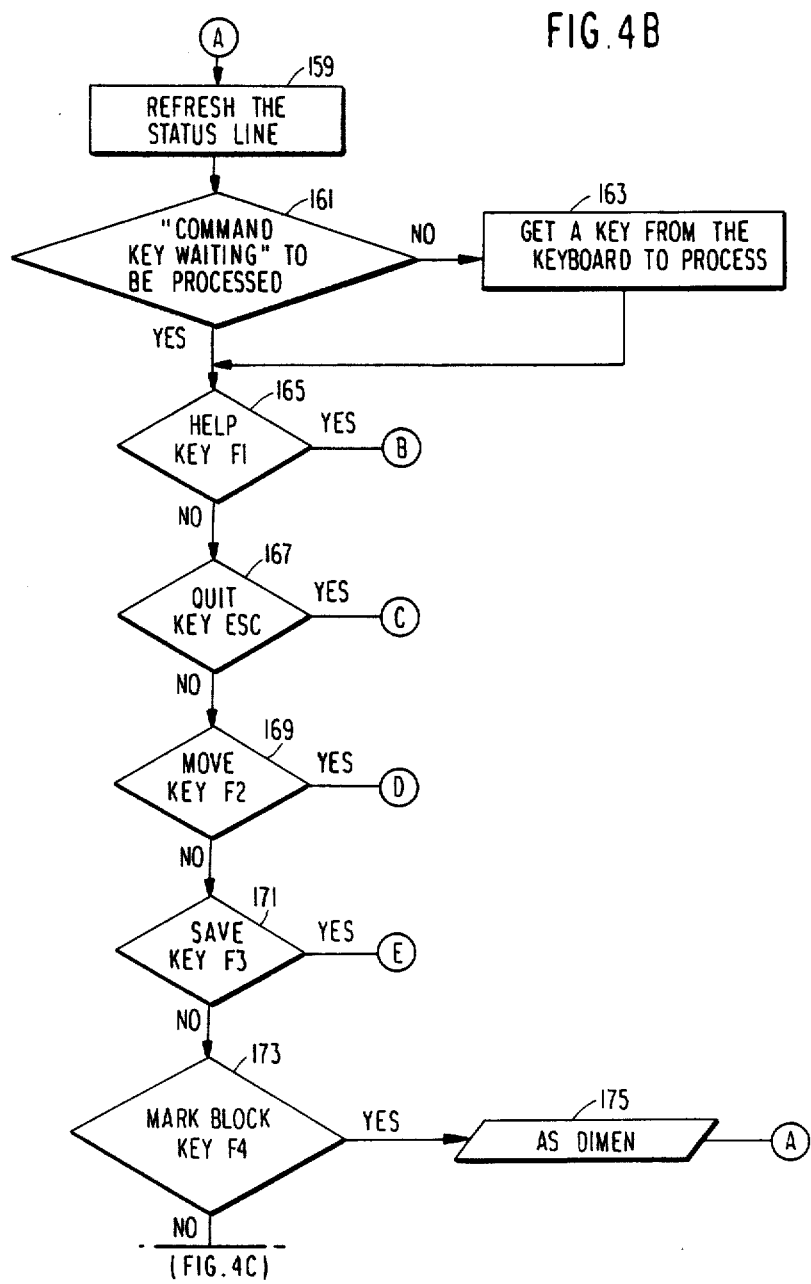

In the flow charts shown in FIGS. 4B and 4C the decision blocks referring to the various keys available to the user are shown in numerical order, not necessarily in their order of use. The user has a number of options.

Referring to FIG. 4B, the AS program refreshes the display status line with the term "dynamic modification". If the user has already pressed a command key to be processed or presess the key after the refresh as shown in blocks 161 and 163, the AS program takes action depending on which key is pressed.

If a Help key (F1) is pressed as shown in decision block 165, the AS program proceeds to the subroutine shown in FIG. 4D which involves displaying the Help window with the meanings of the keys and getting a key from the keyboard which is pressed by the user as shown in blocks 187 and 189. If F1 is pressed again, the Help window is removed or if another key is selected by the user, the Help window is also removed and the program returns to in FIG. 4B.

If the Quit (Escape) key is pressed the program proceeds to at FIG. 4E which asks the user if he really wants to quit. If the answer is yes, the program undoes all changes made by the user and exits. If the user responds no, the program proceeds to in FIG. 4B.

Assuming that the user is ready to modify the contents of the screen or window, he presses the Mark Block key (F4) as shown in block 173 (FIG. 4B) and the program calls the AS DIMEN subroutine which is illustrated in FIG. 4K. In the AS DIMEN subroutine the AS program first asks the user by means of a prompt to supply the first corner of the Block as shown in block 241. The program calls the Keyboard routine (FIG. 7) to allow the user to move the cursor to the first corner as shown in block 243. The program then displays a prompt asking for the second corner as shown in block 245 and the user is allowed to move the cursor to the second corner of the Block. The program then makes a window with all the information contained within the block and the program returns to the calling routine at in FIG. 4B.

The user may then choose from the three types of modifications by selecting appropiate keys.

If the user presses the Move key (F2) at decision block 169, the program proceeds to at FIG. 4F. Pressing the Move key indicates that the user desires to move a block of information or a window to another location on the display as shown in block 205. The AS program then allows the user to move the cursor to the desired position (as specified by a selected new left hand corner position) as shown in block 207 by means of the Keyboard Routine shown in FIGS. 7A to 7C. The AS program then refreshes the display with the Block or window in the new position as shown in block 209. The AS program returns to at FIG. 4B.

Figure 4G:
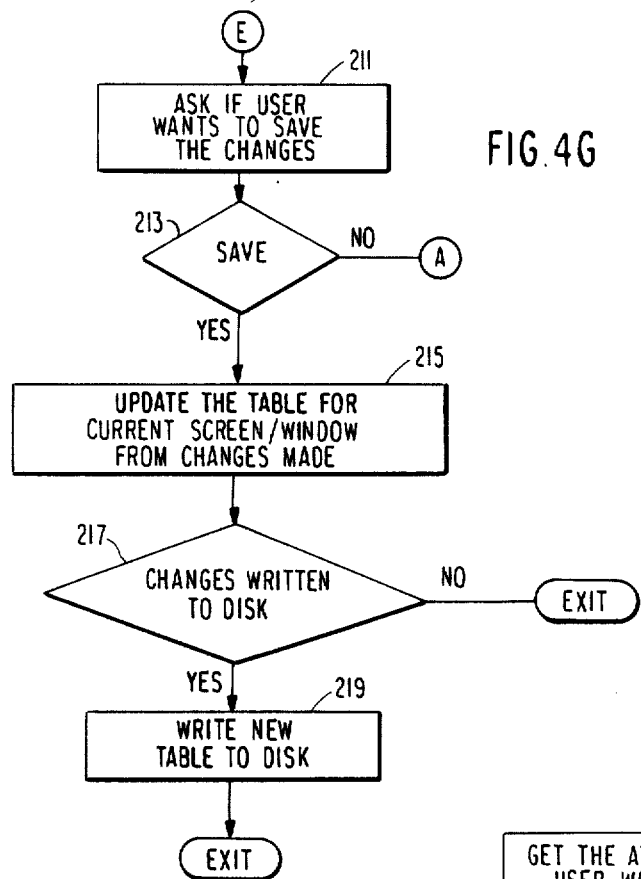
Figure 4H:
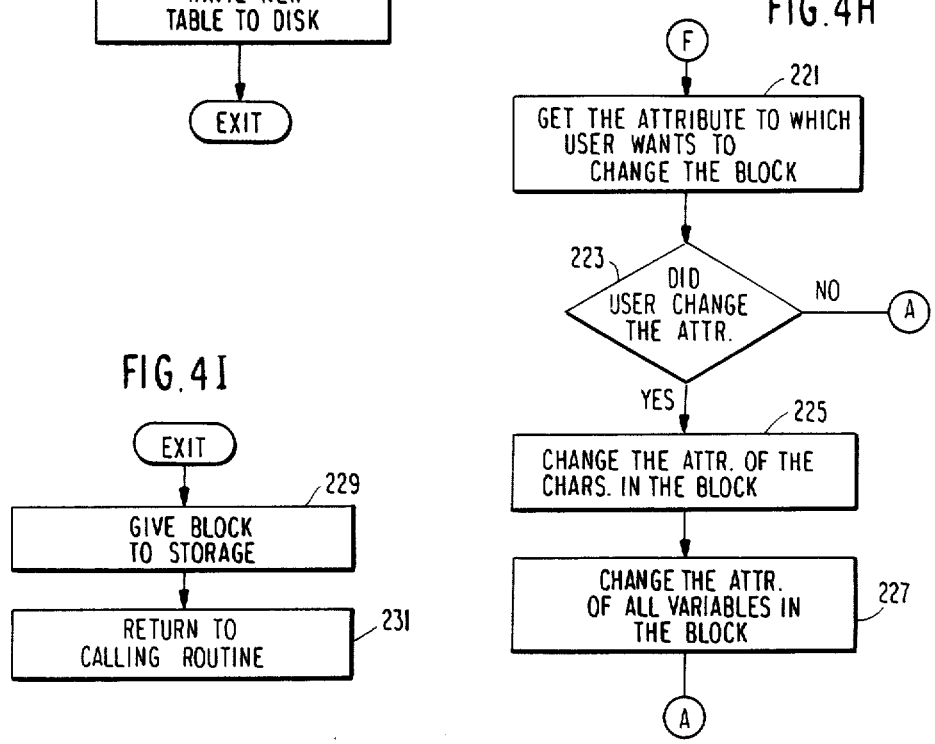
Figure 4I:
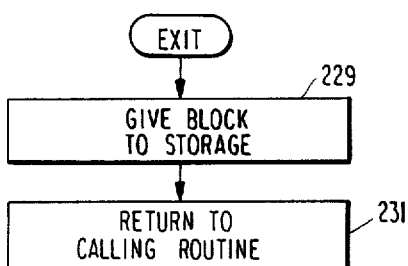

If the user presses the Save key (F3) at decision block 171, the program proceeds to FIG. 4G which asks if the user wants to save the changes as shown in block 211. If the answer is yes, the AS program updates the table in memory to a current screen window which reflects the changes made by the user. The program decides whether the changes should be written to disk. If the answer is no, the routine exits to the calling routine. If the answer is yes, the new table is written to the disk as shown in block 209 and the routine exits.

Turning to FIG. 4C, if the user instead selects the Undo key F5 at decision block 177, the program undoes all of the changes and returns to in FIG. 4A. If the user selects the Change Attribute key F7 at decision block 181 after marking the block, the AS program proceeds to in FIG. 4H. At this point the Display Screen/Window routine already described with respect to FIG. 2 is called by the AS program and a window is displayed on the screen which contains the various colors of the characters, either foreground or background, and a window which displays the monochrome attributes which may be selected such as normal, high intensity, reverse video, etc. The program marks the attribute in the window currently set by the user and the Keyboard routine illustrated in FIG. 7 allows the user to move the cursor to the attribute desired. The user may change the attribute by pressing the Enter key which sets the attribute at the cursor as the current attribute to be used in the screen. At this point as shown in block 225, the program changes the attribute of the characters in the Marked Block as well as the attribute of all variables in the block as shown in block 227. At this point the user would press either F3 or F5 to save or undo the attribute changes as previously discussed.

Returning to FIG. 4C, if the user selects the Change Wording key (F8) in decision block 183 after marking the block, the program enables user-selected characters to be typed from the keyboard in the marked block, thereby changing the information within the block.

In summary, the dynamic modification program allows the user, during the simulation process, to move a block or window, change the attributes of the information within a block and to reword the information in the block. When the operation is completed, the user may exit by pressing the Save key (F3) as previously described.

The Simulation Routine of the AS program is illustrated in FIGS. 5A to 5E. In operation, the user accesses the Simulate Routine 302 by choosing option S from the AS menu. This displays a prompt asking the user for the name of the screen which starts the simulation as shown in block 304. Assuming the screen name is valid, the AS program then stores all tables associated with the first screen into memory (block 306), gets the display ready and sets up a list of keys to look for as shown in block 308. This is accomplished by calling the Evaluate Action Routine (FIGS. 6A to 6D).

Figure 5B:
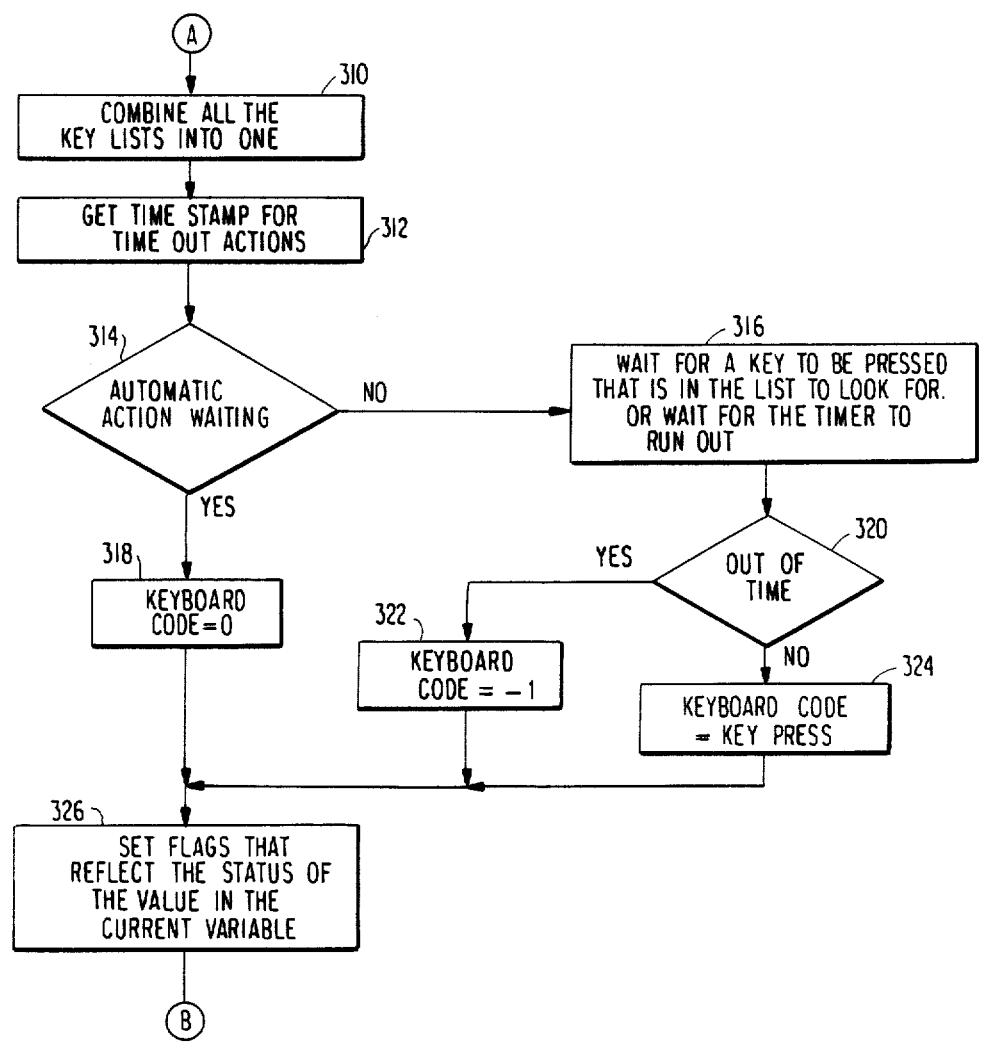

In FIG. 5B all of the key lists are combined into one list in block 310. The program contains a time stamp for actions which may be timed out, as shown in block 312. Decision block 314 decides if there is an automatic action waiting to be performed. If there is no automatic action waiting, then the Keyboard routine (FIGS. 7A to 7C) is called and either waits for a key to be pressed by the user that is in the list or waits for the timer to run out as shown in block 316. If the time does not run out before the user presess a key, decision block 320 exits through block 324. Then the program sets flags that reflect the status of the value in the current variable. The status flags may reflect the following conditions of the value: appropriate (OK), not in the list, invalid characters or out of Range. Assuming that the action is automatic then the program proceeds through block 318 (Keyboard Code =0) to the same block 326.

Figure 5C:
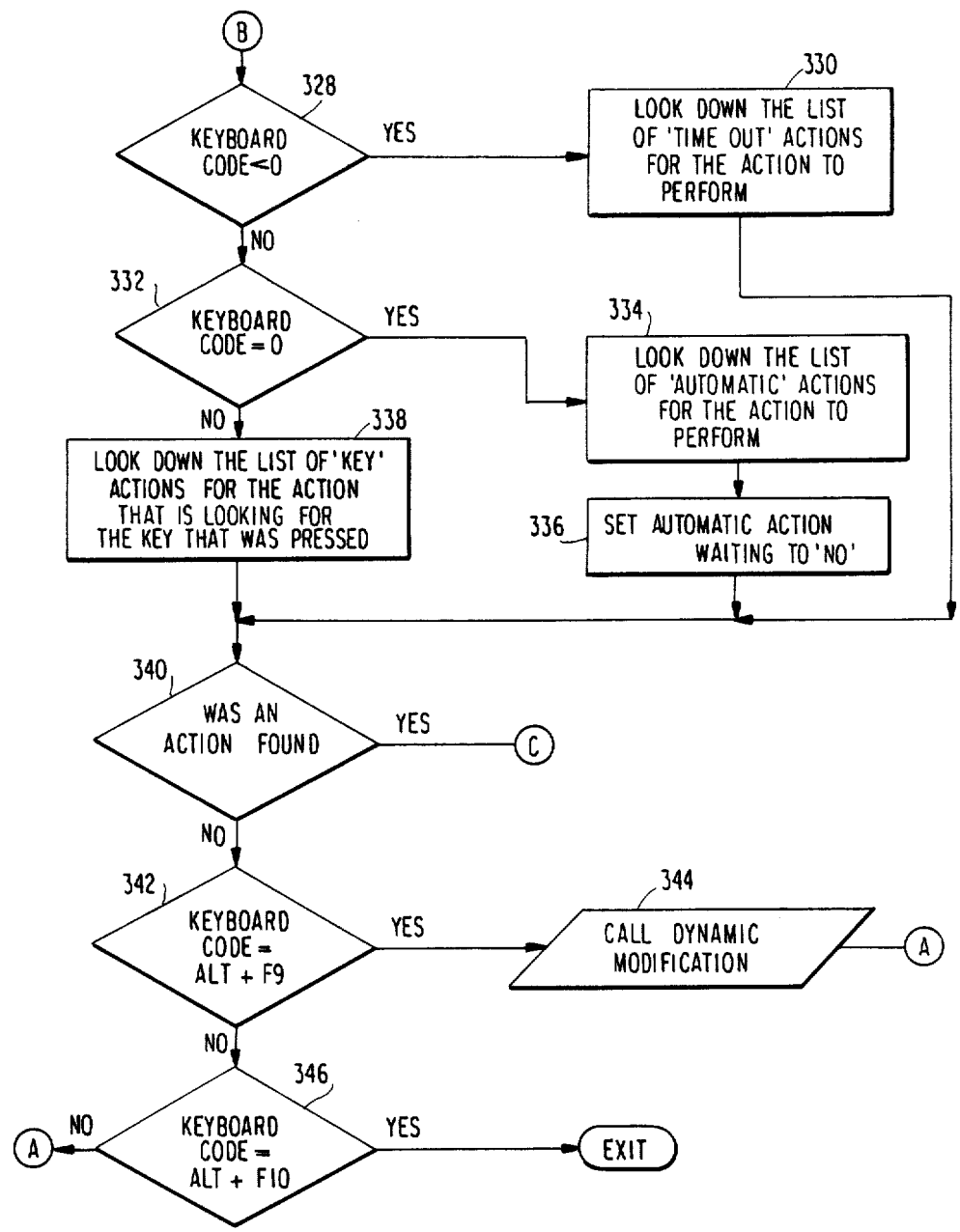
Figure 5D:
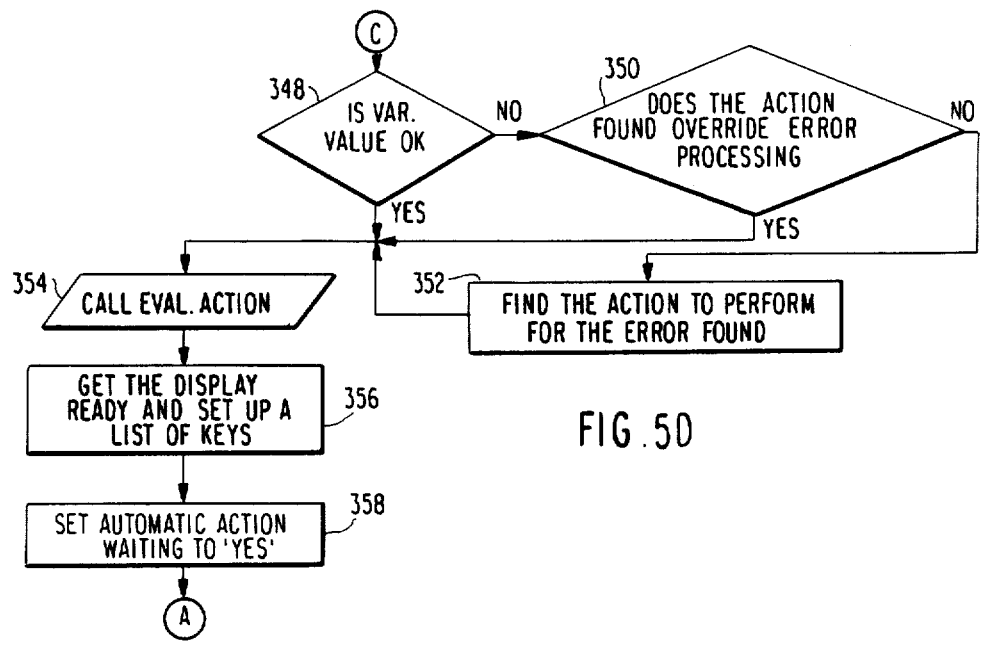

Turning now to FIG. 5C, decision block 328 determines whether time has run out for an action (Keyboard code <zero). If the answer is yes, the program looks for an effect of an action to be performed as shown in block 330. if the answer is no, decision block 332 determines whether the simulator needs to execute an automatic action. If the answer is yes, the program looks for an automatic effect of an action to perform in block 334 and the automatic action waiting flag is set to "no". If the time delay has not expired, the program proceeds to block 338 where the list of the effects of actions which might result from the pressing of a particular key by the user is examined.

The program proceeds to decision block 340 which determines whether an effect of an action was found. If the answer is no and the user presses the Alt +F9 key, indicating that the user wishes to make a dynamic modification, the program proceeds to the Dynamic Modification routine previously discussed with respect to FIGS. 4A to 4K. After the user has made his modification the program returns to in FIG. 5B.

If the user presses the Alt +F10 key, the program exits. If an effect of an action was not found and the user had not pressed the above-mentioned keys, the program returns to in FIG. 5B. If an action was found in decision block 340, the program proceeds to in FIG. 5D. Decision block 348 determines whether the value of the variable is acceptable. If not, decision block 350 determines whether the effect of the action found overrides error processing. If the answer is no, the program finds the effect of the action to perform for that error condition, as shown in block 352.

If the variable found is acceptable, or the action to be taken overrides error processing, the program calls the Evaluate Action subroutine as shown in block 354. The Evaluate Action subroutine will be further described with respect to FIGS. 6A to 6D. The Evaluate Action routine executes the effect called for by the action indicated by the user. For example, pressing an Enter key causes the action of switching from one simulation screen to another. Once the action has been performed, the program again gets the display ready and sets up another list of keys as shown in block 356 and the automatic action waiting flag is set to yes. The program then returns to at FIG. 5B.

In FIG. 5E upon exiting the program, the storage is prepared for the next simulation as shown in block 362 and the program returns to the Main Menu as shown in block 364.

While a simulated program is being executed, the Evaluate Action (or Execute Action) routine performs the actions passed to it by the Simulation routine described with respect to FIGS. 5A to 5E. The Evaluate Action routine has the following functions: ensuring that all tables associated with a particular action are in memory; executing the action; indicating to the Simulation routine what action was performed; and readying the simulation routine to search for the next action to perform. The Simulation routine passes a record of the action to perform to the Evaluate Action routine. The following information is within this record: the type of action to perform, i.e., the cause of the action; the name of the target for the action, i.e., the effect; the position of the value of the current variable in a list of acceptable values for the variables; and the amount of time to delay before executing the action.

FIGS. 6A to 6D is a flow diagram of the Evaluate Action routine. At its initiation at block 402 (FIG. 6A), the user is working with a screen or window during the simulation process. If the target of the action (effect) is to scroll a window in decision block 404, the contents of the window are moved in the direction and the number of lines requested. If the target of the action is to rotate the value of a variable as shown in decision block 406, the routine uses the value in the action record with the position of the value in the acceptable value list to find the previous or next value in the list. This value is moved to the AS display buffer for the current variable. If the target of the action is to display a message, then the routine finds the message to display and moves it to the message variable defined for the current screen/window in the AS diaplay buffer.

After each of the foregoing actions have been performed, the Evaluate Return subroutine (FIG. 6D) returns control to the Simulation routine as shown in blocks 410.

Figure 6A:
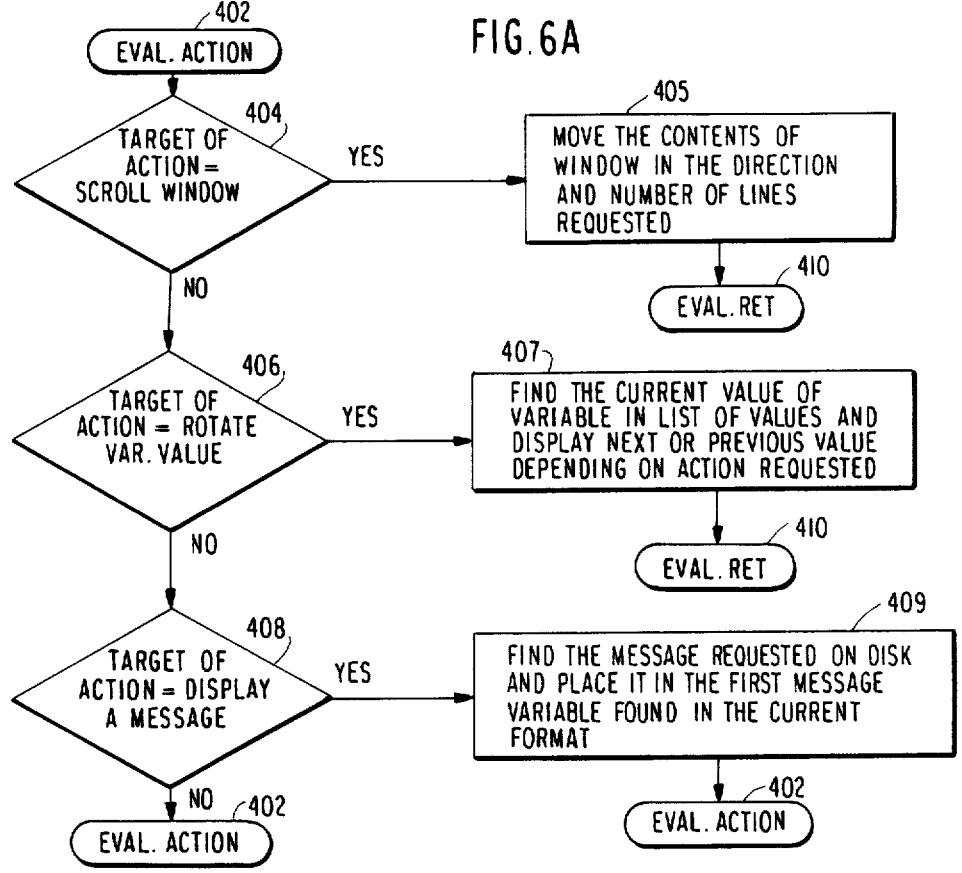
Figure 6B:
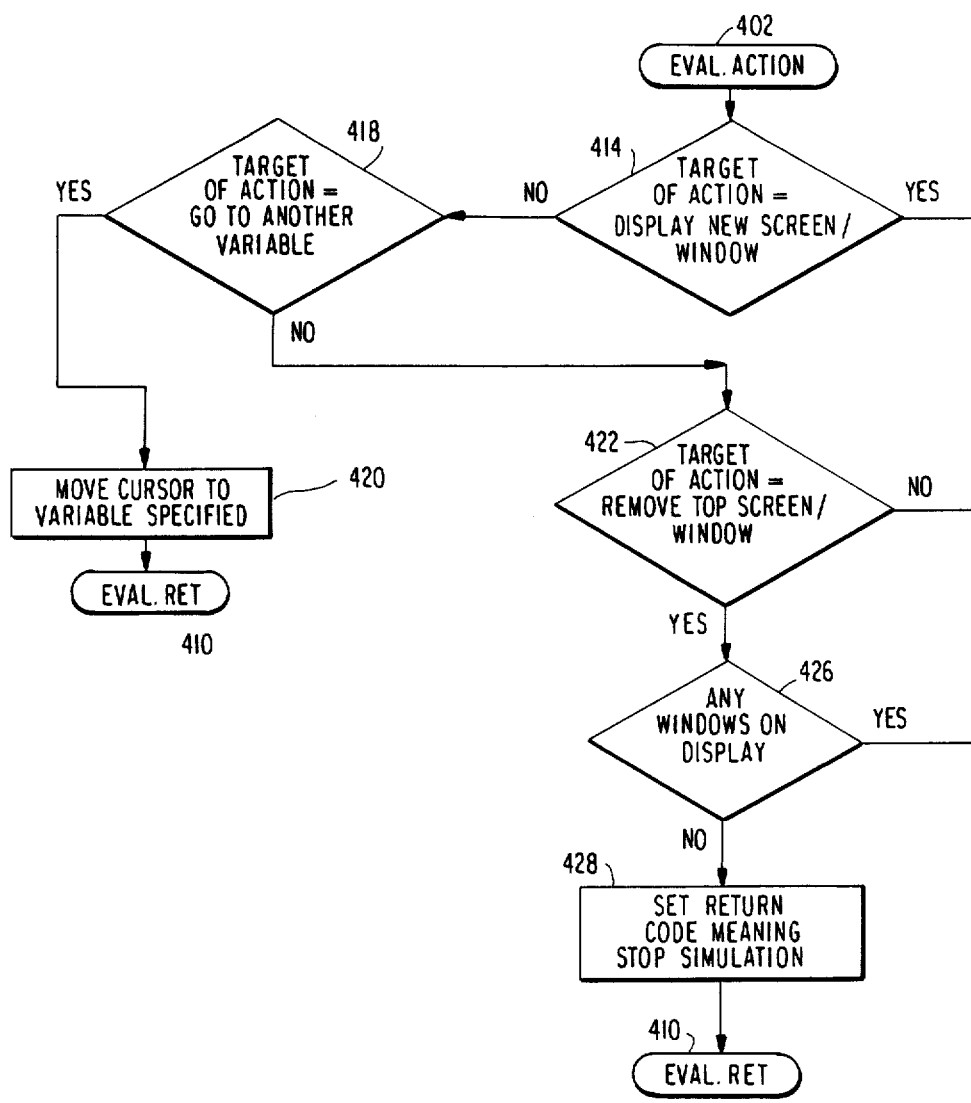

Turning now to FIGS. 6B and 6C, the routine next determines whether the target of the action is a display for a new screen or window. If the answer is yes, the routine gets the tables associated with the new screen or window. The program next determines whether the target of the action is to proceed to another variable as shown in decision block 418. If the answer is yes, the routine moves the cursor to the variables specified as shown in block 420. If the answer is no, the program then determines whether the target of the action is to remove the top screen or window. If the answer is yes, the program checks as to whether any windows are on display. If the answer in decision block 426 is no, the routine sets a return code indicating that the simulation is to be stopped. If the answer in decision block 422 is no, the program sets a return code, meaning that the action requested cannot be evaluated. At this point all of the possible actions have been considered by the Evaluate Action routine, and any further action which might be requested is unavailable or in error.

Referring to FIG. 6D, the Evaluate Return subroutine begins by determining whether a return code has been set as shown in decision block 430. If the answer is yes, control is returned to the Simulation routine as shown in block 434. If the answer is no, the program first sets a return code to tell the Simulator what action was performed as shown in block 432 and the control returns to the Simulation routine.

Figure 7B:
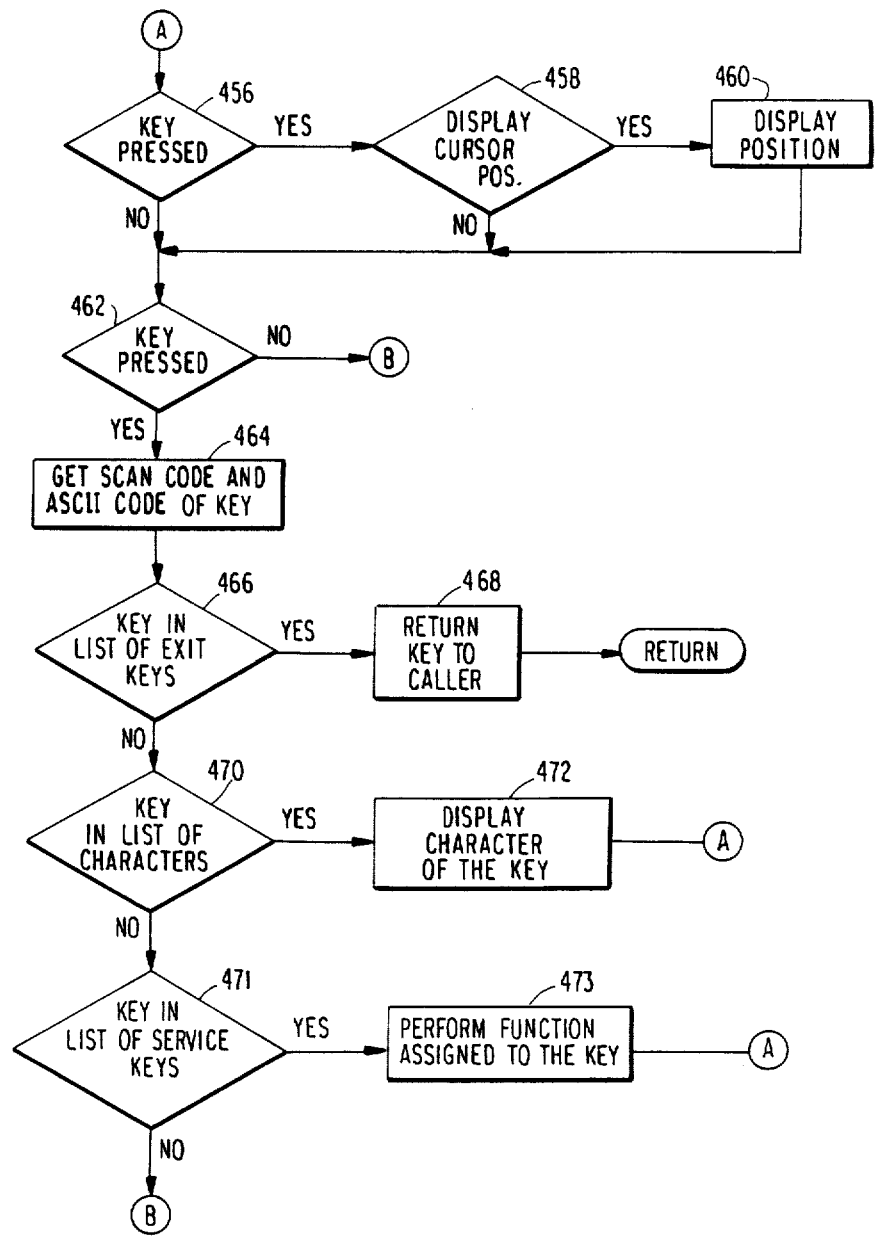

Turning now to FIGS. 7A to 7C, the Keyboard routine controls any part of the process which is based on the entry made by the user from the keyboard. The Keyboard routine may be called by any other routine in the AS program which permits or requires the user to select a key. The calling routine passes information to the Keyboard routine which includes a list of keys needed for further processing; the characters, in terms of ASCII codes which may appear on the display; the list of keys which the keyboard routine can process, i.e. cursor right, delete character; and the area on the display to which the keyboard routine is restricted. At the initiation of the Keyboard routine at block 450 (FIG. 7A), the cursor is moved to the position stored in the current cursor position variable of AS as shown in block 452 and the Key Pressed flag and Insert Character flag are both set to No in block 454.

As shown in FIG. 7B, the program loops until a user presses a key or the time on the timer has expired. In decision block 456 a determination is made as to whether the user pressed a key. If the answer is yes, and if the calling routine wants a cursor position report, then the program writes the current cursor position in the lower right corner of the display as shown in decision blocks 458 and 460. If the decision in either decision blocks 456 or 458 is no, the program again checks in decision block 462 whether the user has pressed a key. If a key is pressed, the program gets the scan code and ASCII code of the key which was pressed as shown in block 464 and a decision is made in decision block 466 whether the key is in list of valid exit keys. If the answer is yes, the program stops the loop and returns the scan code of the key pressed to the calling routine, as shown in block 468. If the answer is no, a decision is made in block 470 whether the key is in the list of valid characters. If the answer is yes, the ASCII code is placed in the current cursor position, and the current cursor position is moved one position to the right and the character of the key is displayed to the user. The program then returns to at the top of FIG. 7B.

If the key pressed by the user is in the list of valid service keys as shown at decision block 471, the program performs the function assigned to the key, for example, move cursor.

If none of the foregoing decisions shown in decision blocks 466, 470 or 471 is true, the routine proceeds to at FIG. 7C. This subroutine determines whether the calling routine wants a timer interrupt or whether the timer has expired as shown in decision blocks 474 and 476. If the answer to either of these decisions is no, the program returns to at FIG. 7B. If the answer to both decisions is yes , a code is returned to the calling routine that the time expired as shown in block 478.

FIGS. 8A to 8E illustrates the "Define Actions" routine of the AS program. The routine begins as shown in block 504 by creating the list of effects of actions that are allowed to be defined. This list has been given above and is actually a pre-defined list available in the AS program. The program than causes the "Define Actions" window, Screen 7, to be displayed as shown in block 506, and the AS program creates a list of the defined actions for the current variable or the current screen/window. In Screen 7, the current variable is VABB. The AS program also sets the current field as being the "action type" so that the field is the first "Cause" field on the Screen.

Figure 8B:
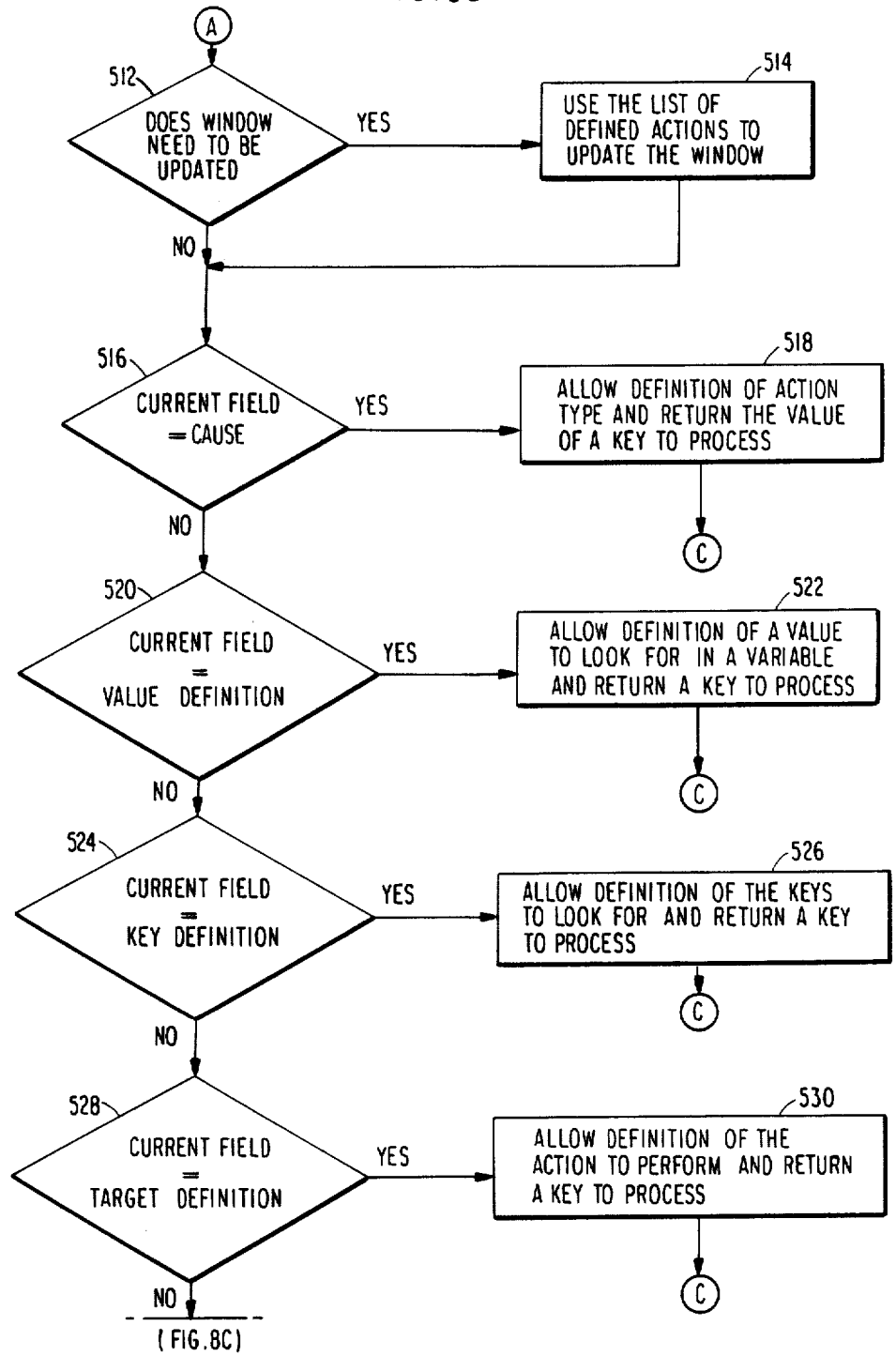

The program then proceeds to FIG. 8B where a decision is made as to whether the window, Screen 7, needs to be updated. If the answer is yes, the program uses the list of defined actions to update screen 7 as shown in blocks 14 and proceeds to a decision as to whether the current field is the Cause field. If the answer is yes, the program allows the user to define the action type and returns the value of a key to process. In the present example, the user has selected that the Cause of the action will be a combination of a value and the pressing of a key.

Figure 8D:
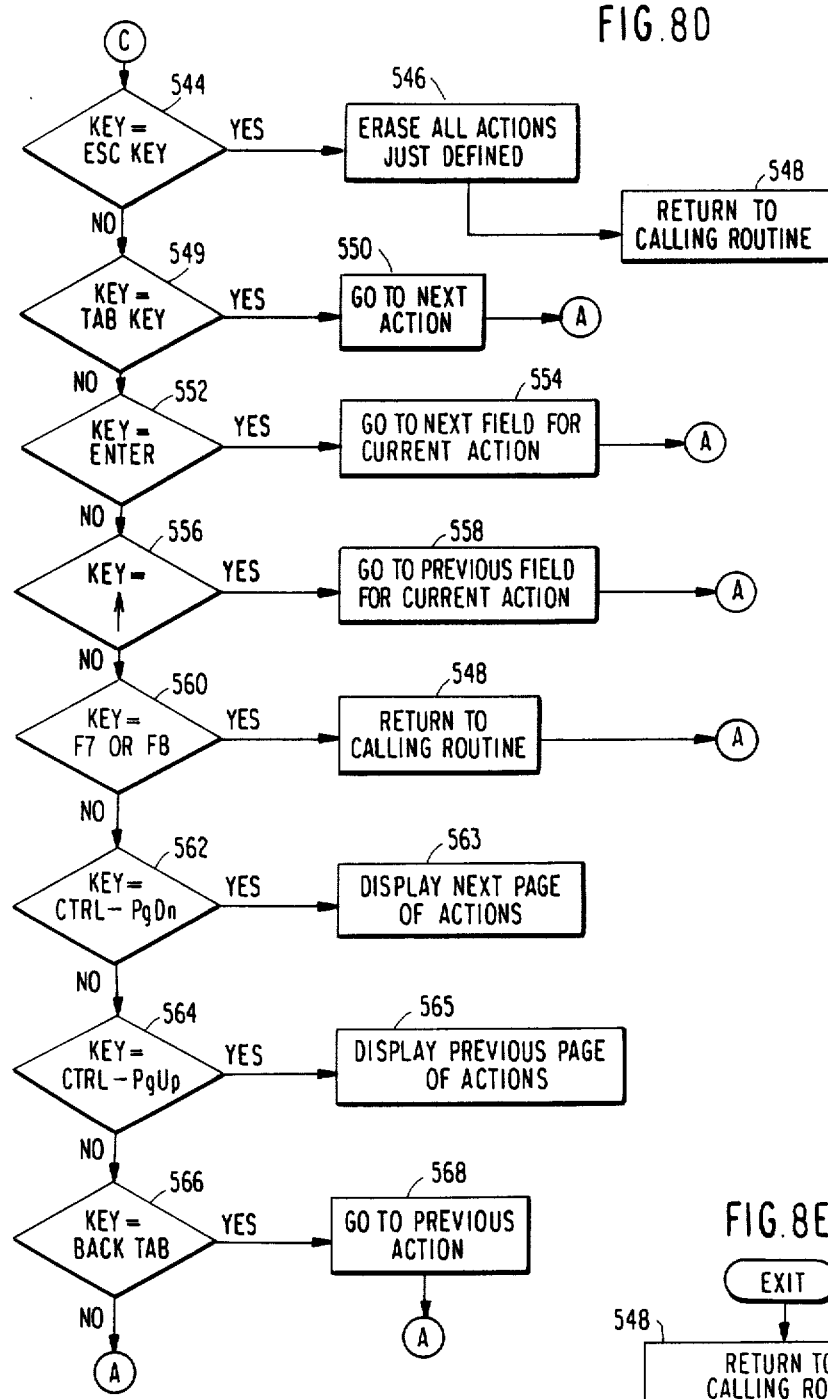
Figure 8E:
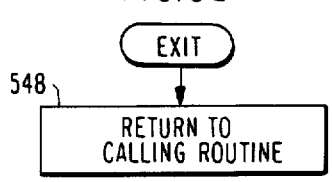

The program then proceeds to FIG. 8D which is essentially a list of all of the keys which the user may select to institute an action. FIG. 8D will be referred to more specifically hereinafter.

Returning to FIG. 8B, if the current field is not set at Cause, the program tests whether the current field is at the Value definition. If the answer is yes, the program allows the definition of a value to look for in a variable and returns a key to process. In the present example, the user has selected the value AL, representing the state of Alabama in our example. If the test in decision block 520 is no, the program then tests whether the current field is the Key definition. If the answer is yes, the user is allowed to define the key which the user may look for to cause an Effect. If the decision in decision block 524 is no, the AS program decides whether the current field is the Target definition, which in Screen 7 is the Effect. If the answer is yes, the user is allowed to define the action to perform to cause the Effect. In the example shown in Screen 7, the user has decided that the value AL and the pressing of an Enter key will transfer the simulated program to another screen.

If the decision in block 528 is no, the AS program proceeds to FIG. 8C where it tests whether the current field is the Name definition, or Screen name, as shown in Screen 7. If the answer is yes, the AS program allows the definition of the screen name which is present when the action is to be performed. In the present example, the screen name is STATEAL. If the decision in decision block 532 is no, the AS program proceeds to decision block 536 which tests whether the current field is the time definition, illustrated as Time in Screen 7. If the answer is yes, the user is allowed to define a time delay for the action as shown in block 538. If the decision in decision block 536 is no, the AS program proceeds to decision block 540 where it checks whether the current field is error checking. If the answer is yes, the user is allowed to define whether error checking should take place during the operation of the simulation program. If the answer is no, the program returns to (A) in FIG. 8B.

FIG. 8D illustrates the various keys which the user may press which will cause an effect such as "transfer to another screen" as shown in Screen 7.

In decisison block 544 if the user presses the Escape key, the AS program erases all of the actions which the user has defined as shown in block 546 and returns to the calling routine as shown in block 558.

If the user presses the Tab key, the AS program goes to the next action of the five actions which are listed in screen 7. If the user presses the return key as shown in decision block 552, the AS program moves the cursor to the next field in the current action. If the user presses the Line Up key as shown in decision 556, the AS program causes the cursor to move to the previous field in the same action. If the user presses key F7 or F8 as shown in decision block 560, the AS program returns to the calling routine as shown in block 548. If the user presses a combination of the control and PgDn keys, as shown in decision block 562, the AS program displays the next page of actions available to the user as shown in block 563. If the user presses the control and PgUp keys, as shown in decision block 564, the program displays the previous page of action as shown in block 565. If the user presses the back tab key as shown in decision block 566, the program moves the cursor to the previous action as shown in block 568.

In this way the user has been allowed to define actions by specifying a cause of an action, such as a value plus a key, and the effect of that action, such as transfer to another screen. In the illustrated example, when the screen name STATEAL screen is displayed and the user moves the cursor to the value AL and presses Enter, the screen then changes to the STATEFL screen. The other states in our example are treated similarly so that the pressing of the Enter key causes the display screen for Alabama to transfer to the screen for Florida and so on.

The following is a functional description of the AS program illustrating the logical structure. It is written in psuedo code which may be readily translated into the code of any programming language.

The invention has been described with respect to a preferred embodiment thereof, but it will be understood by those skilled in the art that changes may be made therein without departing from the spirit and scope of the invention.

Program Initialization

Call Main Menu Routine (Screen 1)

"MAIN MENU ROUTINE"

Loop until user selects task L

1    If the menu is not on the screen call "Display Screen/Window Routine" to display the Main Menu (Screen 1).

2    Call "Keyboard Routine" to get a key to process.

3    If the key is the ENTER key then:

a.    Call "Edit a Screen Format Routine" if task 1 is selected.

b.    Call "Edit a Window Format Routine" if task 3 is selected.

c.    Call "Edit a Simulation Screen/Window Routine" if task 2 or 4 is selected.

d.    Call "Edit a Message Routine" if task 5 is selected.

e.    Call "Print Simulated Report Routine" if task P is selected.

f.    Call "Run Simulation Routine" if task S is selected.

g.    Stop loop if task L is selected.

4    Else if a cursor movement key is pressed, move the cursor to the next or previous option on the menu.

"EDIT A SCREEN FORMAT ROUTINE"

1. Call "Display Screen/Window Routine" to ask for the name of the screen and to display the screen requested.

2. Set a flag that there is no command waiting to be processed.

3. Loop until the user saves the screen or until he quits working with the screen.

a. If there is a command waiting to be processed:

1) Move the contents of command waiting to command to process.

2) Set the flag to no command waiting.

b. Otherwise call "Keyboard Routine" to allow the user to type constants on the screen. (The "Keyboard Routine" will eventually return the key value of a command to process.)

c. Evaluate the command key to process:

1) Esc key - Quit working with the screen.

a) Ask the simulation author if he really wants to quit since this will throw away any changes he made.

b) If he decides he does want to quit then stop the loop.

2) F1 key - Display the help window.

a) Call "Display Screen/Window Routine" to display the help window.

b) Since the help window shows the function key definitions, call "Keyboard Routine" so the user can press a command key listed in the window.

c) If the user pressed the F1 key then set command waiting to no.

d) Otherwise set command waiting to the key pressed.

3) F2 key - Draw graphics on screen.

When the user presses one of the cursor movement keys, place a graphics character at the position just vacated.

4) F3 key - Save screen.

a) If the screen does not have a name, keep asking the user for a name until he supplies one or presses the Esc key.

b) If we still need to save the screen:

i. Convert the screen image to a format table.

ii. Write the table to disk.

iii. Stop the loop.

5) F4 key - Edit a window format.

Call "Edit a Window Format Routine".

6) F6 key - List screen formats stored on disk.

7) F7 key - Change the attribute of the characters or the entire screen.

Call "Attributes Routine".

8) F8 key - Edit variables for this screen.

Call "Edit Variables Routine".

9) F10 Key - Turn the AS status line on/off.

10) Alt-F9 key combination - Dynamic modification.

Call "Dynamic Modification Routine".

"EDIT A WINDOW FORMAT ROUTINE"

1  Call "Display Screen/Window Routine" to ask for the name of the window and to display the window requested.

2  If the requested window is not defined yet then call "Get Dimensions Routine" to get position and size of the window.

3  Set a flag that there is no command waiting to be processed.

4  Loop until the user either saves or quits working with the window.

a. If there is a command waiting to be processed:

1) Move the contents of command waiting to the command to process.

2) Set the flag to no command waiting.

b. Otherwise call "Keyboard Routine" to allow the user to type constants on the window. "Keyboard Routine" will eventually return the key value of a command to process.

c. Evaluate the command key to process:

1) Esc key - Quit working with the window.

a) Ask the user if he really wants to quit (this will throw away any changes he made).

b) If he decides he does want to quit then stop the loop.

2) F1 key - Display the help window.

a) Call "Display Screen/Window Routine" to display the help window.

b) Since the help window shows the function key definitions, call "Keyboard Routine" so the user can press a command key listed in the window.

c) If the user pressed the F1 key then set command waiting to no.

d) Otherwise set command waiting to the key he pressed.

3) F2 key - Draw graphics in window.

When the user presses one of the cursor movement keys, place a graphics character at the position just vacated.

4) F3 key - Save window.

a) If the window does not have a name, keep asking the user for a name until he supplies one or presses the Esc kay.

b) If we still need to save the window:

i. Convert the window image to a format table.

ii. Write the table to disk.

iii. Stop the loop.

5) F4 key - Change dimensions of the window.

Call "Get Dimensions Routine".

6) F5 key - Set window type.

7) F6 key - List window formats stored on disk.

8) F7 key - Change the attribute of the characters or the entire window.

Call "Attributes Routine".

9) F8 key - Edit variables for this window.

Call "Edit Variables Routine".

10) F10 Key - Turn the AS status line on/off.

11) Alt-F9 key combination - Dynamic mofidication.

Call "Dynamic Modification Routine".

"EDIT A SIMULATION SCREEN/WINDOW ROUTINE"

1   Call "Display Screen/Window Routine" to display the prompt that asks the user for the name of the simulation screen/window table.

2   Call "Keyboard Routine" to get the simulation table name.

3   If the name is invalid then goto step 2.

4   If the user did not supply a table name then set the New Table flag.

5   If the user supplied a name then:

a.  Find the table on disk.

b.  If the table is not found then set the New Table flag.

6   Call "Display Screen/Window Routine" to display the screen/window format associated with the simulation screen/window table.

If the New Table flag is set, then ask "Display Screen/Window Routine" to ask the user for the name of the format table to associate with this new simulation table.

7   Set a flag that there is no command waiting to be processed.

8   Set the first variable in the screen/window as the current variable.

9. Loop until the user saves the simulation screen/window or until he quits working with the simulation screen/window.

a. If there is a command waiting to be processed:

1) Move the contents of command waiting to the command to process.

2) Set the flag to no command waiting.

b. Otherwise call "Keyboard Routine" to allow the user to type a value into the current variable. The "Keyboard Routine" will eventually return the key value of a command to process.

c. If there is a value in the current variable then place the value in the Value List of the simulation table.

d. Evaluate the command key to process:

1) ENTER key - Move cursor to next variable.

2) Esc key - Quit working with the simulation screen/window.

a) Ask the user if he really wants to quit (this will throw away any changes he made.)

b) If he decides he does want to quit then stop the loop.

3) F1 key - Display the help window.

a) Call "Display Screen/Window Routine" to display the help window.

b) Since the help window shows the function key definitions call "Keyboard Routine" so the user can press a command key listed in the window.

c) If the user pressed the F1 key then set command waiting to no.

d) Otherwise set command waiting to the key pressed.

4) F2 key - Delete value in current variable.

5) F3 key - Save simulation screen/window.

a) If the simulation screen/window does not have a name, keep asking the user for a name until he supplies one or by presses the Esc key.

b) If we still need to save the simulation screen/window:

i. Write the table to disk.

ii. Stop the loop.

6) F6 key - Display a list of defined simulation screens/windows stored on disk.

7) F7 key - Define screen/window actions.

Call "Define Actions Routine".

8) F8 key - Define variable actions.

Call "Define Actions Routine".

9) F9 key - Define variable error actions.

Call "Define Actions Routine".

10) F10 key - Turn the AS status line on/off.

11) Alt-F9 key combination - Dynamic modification.

Call "Dynamic Modification Routine".

"EDIT A MESSAGE ROUTINE"

1 Set a flag that there is no command waiting to be processed (this will be explained later).

2 Loop until the user saves the messages or until he quits working with the messages.

a. If there is a command waiting to be processed:

1) Move the contents of command waiting to the command to process.

2) Set the flag to no command waiting.

b. Otherwise call "Keyboard Routine" to allow the user to type a value into the current message. The "Keyboard Routine" will eventually return the key value of a command to process.

c. Evaluate the command key to process:

1) ENTER key - Move cursor to next message.

2) Esc key - Quit working with the messages.

a) Ask the user if he really wants to quit since this will throw away any changes he made.

b) If he decides he does want to quit then stop the loop.

3) F1 key - Display the help window.

a) Call "Display Screen/Window Routine" to display the help window.

b) Since the help window shows the function key definition call "Keyboard Routine" so the user can press a command key listed in the window.

c) If the user pressed the F1 key then set command waiting to no.

d) Otherwise set command waiting to the key pressed.

4) F2 key - Save current message.

5) F3 key - Save all messages and exit.

6) F6 key - Display a list of defined messages stored on disk.

7) F9 key - Remove the current message from the display.

8) F10 Key - Turn the AS status line on/off.

"PRINT SIMULATED REPORT ROUTINE"

1   If a name is needed from the user:

a. Call "Display Screen/Window Routine" to display the prompt that asks the user for the name of the report to print.

b. Loop until the user supplies a valid name or presses the Esc key.

1) Call "Keyboard Routine" to allow the user to type the name of the report.

2) If the name is valid then stop the loop.

c. If the user did not press the Esc key:

Call "Display Screen/Window Routine" to display the screen that tells the user the status of printing the report.

2. Loop until the end of the file to print is reached.

a. Read a character from the file.

b. If the character is a change the font character then:

1) Change the font of the printer.

2) If the calling routine is "AS Main Menu Routine" then show the user the new font.

c. Otherwise print the character.

"RUN SIMULATION ROUTINE"

1. Call "Display Screen/Window Routine" to display the prompt that asks the user for the name of the screen that starts the simulation.

2. Loop until the first screen is displayed or the user presses the Esc key.

a. Call "Keyboard Routine" to allow the user to type the name of the screen.

b. If the name is valid then:

1) Construct an action record that will display the first screen.

2) Call "Execute Action Routine" to get the simulation ready with the first screen.

3) If "Execute Action Routine" found all the tables for the screen then stop the loop.

3. If the user did not press the Esc key then:

Loop until "Execute Action Routine" says to stop the simulation.

a. Get a new time stamp for the time out actions.

b. If there is no automatic action waiting to be processed then call "Keyboard Routine". "Execute Action Routine" will set up the following information to pass to "Keyboard Routine"

1) List of valid action keys.

2) List of valid characters that can be typed in a variable.

3) List of keys "Keyboard Routine" can evaluate.

c. Get a time stamp in case the action needs a delay before executing.

d. Call "Evaluate Variable Value Routine" to see if the value of the current variable is valid. "Evaluate Variable Value Routine" will return the following information.

1) If the value is in the acceptable value list then the index into the list is returned.

2) The error conditions found.

e. Find the action to perform in either the key action, automatic action, or timeout action list.

f. If the action to perform was found or if an error was found in the variable's value then:

1) If an error is found in the variable's value then find the action to perform for the error condition.

2) Call "Execute Action Routine" to execute the action.

g. Else if the user pressed the Alt-F9 key combination then call "Dynamic Modification Routine".

h. Else if the user pressed the Alt-F10 key combination then stop the loop for the simulation.

4 Write all the global variable records kept in memory back to disk.

"EDIT VARIABLES ROUTINE"

1 Set a flag that there is no command waiting to be processed.

2 If there are no variables defined for the screen/window format:

Set the command waiting to F8 to define a new variable.

3 Loop until the simulation author saves the variables or until he quits working with the variables.

a. If there is a command waiting to be processed:

1) Move the contents of command waiting to the command to process.

2) Set the flag to no command waiting.

b. Otherwise call "Keyboard Routine" to get a command key to process from the user.

c. Evaluate the command key to process:

1) Esc key - Quit working with variables for the format.

a) Ask the user if he really wants to quit since this will throw away any changes he made.

b) If he decides he does want to quit then stop the loop.

2) F1 key - Display the help window.

a) Call "Display Screen/Window Routine" to display the help window.

b) Since the help window shows the function key definitions, call "Keyboard Routine" so the user can press a command key listed in the window.

c) If the user pressed the F1 key then set command waiting to no.

d) Otherwise set command waiting to the key pressed.

3) F2 key - Move a variable.

4) F3 key - Save variables.

5) F4 key - Edit a acceptable values of a variable.

6) F5 key - Set optional variable characteristics.

a) Call "Display Screen/Window Routine" to display the Variable Characteristics Window (Screen 2).

b) Allow the user to change the options in the window.

7) F6 key - Display a list of all global variable records stored on disk.

8) F7 key - Change the attribute of a variable.

Call "Attributes Routine".

9) F8 key - Define a new variable for the format.

10) F9 key - Copy a variable already defined for the format.

11) F10 Key - Turn the AS status line on/off.

12) Alt-F1 key combination - Remove a variable.

"DYNAMIC MODIFICATION ROUTINE"

1  Call "Display Screen/Window Routine" to refresh the display.

2  Get some storage for the temporary screen/window format tables needed by this routine.

3  Copy of the current screen/window format into temporary storage.

4  Set a flag that there is no command waiting to be processed.

5  Loop until the person presses the F3 key to save the format or the Esc key to quit this routine.

a. If there is a command waiting to be processed:

1) Move the contents of command waiting to the command to process.

2) Set the flag to no command waiting.

b. Otherwise call "Keyboard Routine". "Keyboard Routine" will eventually return the key value of a command to process.

c. Evaluate the command key to process:

1) Esc key - Quit the "Dynamic Modification Routine".

a) Ask the user if he really wants to quit (this will throw away any changes he made).

b) If he decides he does want to quit then:

i. Set command waiting to F5 to undo the changes.

ii. Once finished undoing the changes, stop the loop.

2) F1 key - Display the help window.

a) Call "Display Screen/Window Routine" to display the help window.

b) Since the help window shows the function key definitions, call "Keyboard Routine" so the user can press a command key listed in the window.

c) If the user pressed the F1 key then set command waiting to no.

d) Otherwise set command waiting to yes.

3) F2 key - Move the marked block or the current window.

a) Ask the user to move the cursor to the new upper left hand corner.

b) Call "Keyboard Routine" to move the cursor.

c) Call "Display Screen/Window Routine" to refresh the display with block or window in the new position.

4) F3 key - Save changes.

a) Ask the user if he wants to save his changes, since he might have pressed the wrong key.

b) If we still need to save the changes:

i. Save the changes in the current screen/window format table.

ii. Write the table to disk.

iii. Stop the loop.

5) F4 key - Mark a block.

Call "Get Dimensions Routine" to get the block.

6) F5 key - Undo changes.

Use the saved copy of the screen/window table to refresh the display.

7) F7 key - Change the attribute of the current block.

a) Call "Attributes Routine".

b) Change the attribute of the block.

8) F8 key - Change wording in the block.

Call "Keyboard Routine" to allow the user to change the characters in the block.

9) F10 Key - Turn the AS status line on/off.

"DISPLAY SCREEN/WINDOW ROUTINE"

1   If the calling routine wants this routine to ask the user for the name of the screen/window to display:

a. Call "Display Screen/Window Routine" to display a prompt to ask the user for a screen/window name (recursive call but the name of the table is already supplied).

b. If the name the user supplied is invalid then go to step a.

c. Otherwise if he did not supply a name then continue, but tell the calling routine that a name was not supplied and let it decide what to do.

2   If there is a name for the table:

See if the table is located in the chain of screen/window tables stored in memory.

3   If the table was not found in memory or there is no name for the file:

Allocate a new screen/window table in the chain.

4   If a name is supplied:

a. Find the table on disk.

b. If the table was found on disk, place the table found in the spot allocated in the chain.

c. Otherwise set a return code to tell the calling routine the table was not found anywhere, and let it decide what to do.

5   If the table was found:

a. Add the table in the chain to the sub-chain of screen/windows currently on the display.

b. Convert the table into its display image into the AS working display buffer.

c. Replace the computer's display buffer with the working display buffer.

"KEYBOARD ROUTINE"

1. Move the cursor to the position stored in AS's Current Cursor Position variable.

2. Set both the Key Pressed flag and the Insert Character flag to no.

3. Loop until the user presses a key that is in the set of valid exit keys or the timer has expired.

a. If a Key Pressed flag is yes:

If the calling routine wants a cursor position report then write the current cursor position in the lower right corner of the display.

b. Set both the scan code and the ASCII code to 0.

c. See if a key was pressed.

1) Get the scan code if a key was pressed.

2) Get the ASCII code if a key was pressed.

3) Set Key Pressed flag to yes.

d. If either the scan code or the ASCII code is not 0:

1) If the scan code is in the list of valid exit keys:

a) Stop the loop.

b) Return the scan code of the key pressed to the calling routine.

2) Else if the ASCII code is in the list of valid characters:

a) If the Insert character flag is on then shift the contents of the current line to the right one position.

b) Place the ASCII code in the Current Cursor Position.

c) Move the Current Cursor Position one position to the right.

3) Else if the scan code is in the list of valid service keys:

a) Perform the function assigned to the key. For Example: Move the Cursor e. Else if the calling routine wants a time interrupt and the timer has expired:

1) Stop the loop.

2) Return a time has expired code to the calling routine.

"ATTRIBUTES ROUTINE"

1  Call "Display Screen/Window Routine" to display the Attributes Window.

2  Loop until the user presses the Esc or F7 key.

a. Mark the attribute in the window currently set.

b. Call "Keyboard Routine" to allow the user to move the cursor to the attribute he wants.

c. "Keyboard Routine" will eventually return a value of a key to process further.

1) If key is the ENTER key:

Set the attribute at the cursor as the current attribute.

2) If key is the Esc key:

a) Do not return the attributes selected to the calling routine.

b) Stop the loop.

3) If key is the F7 key:

a) Return the attributes selected to the calling routine.

b) Stop the loop.

"GET DIMENSIONS ROUTINE"

1  Call "Display Screen/Window Routine" to display the prompt asking the user to supply the first corner.

2  Call "Keyboard Routine" to allow the user to move the cursor to the first corner.

3  The AS variable Current Cursor Position will contain the position on the display for the first corner; therefore, mark this position to show the user the position be selected.

4   Call "Display Screen/Window Routine" to display the prompt asking for the second corner.

5   If the calling routine is asking for variable dimensions:

a.   Call "Keyboard Routine" to allow the user to move the cursor to the second corner or to type the length of the variable.

b.   If the user types the length:

Make sure the length will keep the dimension within the restricted area.

6   Otherwise call "Keyboard Routine" to allow the user to move the cursor to the second corner.

7   Adjust the positions of the corners so this routine will return the upper left corner and the lower right corner to the calling routine.

"DEFINE ACTIONS ROUTINE"

1   Call "Display Screen/Window Routine" to display the Define Actions Screen.

2   Fill in the screen with information for first five actions defined for the current variable or the current screen/window.

3   Set the current action flag to the first action in the screen.

4   Set the current field flag to the cause field in the first action.

5   Loop until the user press either the F7, the F8 key or the Esc key.

a.   Test condition of the current field flag.

1)   Cause field.

a)   Call "Keyboard Routine" to get a key from the user to process.

b)   If the key to process is either the PgUp or the PgDn key then change the value in the field to the next value in the list of possible values for this field.

c)   Otherwise pass the key pressed along for further processing.

2)   Value field.

a)  Call "Keyboard Routine" to get a key from the user to process.

b)  If the key to process is either the PgUp or the PgDn key then change the value in the field to the next value in the list of acceptable values for the current variable.

c)  Otherwise pass the key pressed along for further processing.

3)  Key Field.

a)  If no keys are defined for the current action then:

i.  Loop until the user presses the ENTER key.

i)  Call "Keyboard Routine" to allow the user to press any key combination supported by the system.

ii) Display the key combination the user pressed.

b)  Otherwise i.  Call "Keyboard Routine" to get a key from the user for further to pass on for further processing.

4)  Target field.

a)  Call "Keyboard Routine" to get a key from the user to process.

b)  If the key to process is either the PgUp or the PgDn key then change the value in the field to the next value in the list of possible values for this field.

c)  Otherwise pass the key pressed along for further processing.

5)  Name Field.

a)  Call "Keyboard Routine" to allow the user to type the name of the target and to get a key for further processing.

6)  Time field.

a) Call "Keyboard Routine" to allow the user to type the time value and to get a key for further processing.

7) Error Checking Field.

a) Call "Keyboard Routine" to get a key from the user to process.

b) If the key to process is either the PgUp or the PgDn key then change the value in the field to either YES or NO.

c) Otherwise pass the key pressed along for further processing.

8) Evaluate key passed on for further processing.

a) Esc key - Stop the loop.

b) ENTER key - Set the current field flag to the next field c) TAB key - Set the current action flag to the next action.

d) F7 or F8 key:

i. Save the actions defined.
      ii. Stop the loop.

e) Ctrl-PgDn key combination - Display next page of actions.

f) Ctrl-PgUp key combination - Display previous page of actions.

g) Alt-C key combination - Copy the current action.

h) Alt-D key combination - Delete the current action.

"EVALUATE VARIABLE VALUE ROUTINE"

1   Left justify the value to help find the acceptable value.

2   Convert the value to the case specified in the format table.

3   If the value of the variable is not in the list of acceptable values then set the acceptable value error bit.

4   If characters in the value are not the correct edit type then set the edit error bit.

5   If the value is not in the correct range then set the range error bit.

6   Justify the variable specified in the format table.

7   Change the attribute of the variable to either its error attribute if an error was found or its regular attribute if no error was found.

"EVALUATE ACTION (EXECUTE ACTION) ROUTINE"

1   If action is "Display a Screen", "Display a Window" or "Replace the Current Window with Another" then:

a.  If the action is "Replace the Current Window" then:

1)  Remove the current window from the list of screen and windows currently on the display.

2)  Call "Display Screen/Window Routine" to refresh the AS display buffer with the current window removed.

b.  Find the simulation table for the new screen/window either in memory or on disk.

c.  Call "Display Screen/Window Routine" and ask it to do the following functions:

1)  Find the format table associated with the simulation table.

2)  Find all the global variable records defined for the screen/window.

3)  Construct the screen/window in the AS's display buffer but do not move that buffer to the system's display buffer.

4)  Move the current values of each variable into their positions in the AS display buffer.

d.  If "Display Screen/Window Routine" coud not find one of the tables associated with screen/window then set the error flag.

2   Otherwise if the action is to "Remove the Current Window" then:

a.  Remove the current window from the list of screen and windows currently on the display.

b. Call "Display Screen/Window Routine" to refresh the AS display buffer with the current window removed.

3   Otherwise if the action is "Transfer to Another Variable" then:

a. Set the current variable flag to the variable requested by the action.

4   Otherwise if the action is "Display a Message" then:

a. Find the message to display.

b. Move the message to the message variable defined for the current screen/window in the AS display buffer.

5   Otherwise if the action is "Rotate the value of the variable" then:

a. Use the value in the action record with the position of the value in the acceptable value list to find the previous or next value in the list.

b. Move this value to the AS display buffer for the current variable.

6   Otherwise if the action is "Scroll this Window" then:

a. Move the contents of the current window in the direction and number of lines requested.

7   Otherwise if the action is "Print a Report" then:

a. Call "Print Simulated Report Routine" to print the report and pass the name of the report requested.

8   Otherwise if the action is Return to the AS Main Menu then:

a. Set a code to return to "Run Simulator Routine" to stop the simulation.

At this point everything should be ready to execute the action.

9   If the error flag is set then:

a. Display the error message associated with the error found.

b. Set a code to return to "Run Simulation Routine" to stop the simulation.

10  Otherwise a. Loop until the number of seconds to display have passed.

b. Transfer the contents of the AS display buffer to the system display buffer.

c. Move the cursor to the position of the current variable.

d. Construct a list of keys the simulation should look for to perform the next action.

e. Construct a list of valid characters that can be typed in the current variable.

f. Construct a list of keys the "Keyboard Routine" can evaluate.

g. Set up the timer for any new time out actions.

h. Set a code to tell the "Run Simulation Routine" what action was just performed.

We claim:

1. An interactive method for dynamically simulating a computer program by selectively displaying external interfaces of the computer program on a display device of a programmable digital computer in which a plurality of simulated interfaces are stored in a memory of said digital computer and in which each said simulated interface may be selectively displayed on said display device associated with said digital computer in response to inputs by a user, said method comprising the steps of:

logically interconnecting said simulated interfaces stored in memory to create an executable set of simulated computer program interfaces which simulate said computer program;

displaying a selected simulated interface stored in memory on said display device upon the entry of a command by a user to initiate an execution of said set of simulated computer program interfaces;

during said execution, selectively modifying the appearance of the information on at least one simulated interface upon entry of a command by a user; and storing the modified simulated interface in the memory of said digital computer.

2. The method as in claim 1 wherein the step of logically interconnecting said simulated interfaces stored in memory is accomplished partially upon the entry of commands by a user.

3. The method as in claim 2 further comprising the step of:

causing the logical interconnection between a simulated interface and another simulated interface stored in memory to be altered upon the entry of a command by the user.

4. The method as in claim 1 wherein said selected simulated interface stored in memory is a screen or window.

5. The method as in claim 4 wherein said screen or window is described by a table and further comprising the steps of:

creating the screen or window from the table when it is ready to be displayed on said display device; and causing a modified screen or window to be stored as a table as a replacement for the selected screen or window.

6. The method as in claim 1 wherein the step of logically interconnecting said simulated interfaces stored in memory to create said executable set of simulated computer program interfaces is performed prior to creating program code for a computer program simulated by said executable set of simulated computer program interfaces.

7. The method of claim 1 where the step of selectively modifying comprises:

indicating a block of data within said one simulated interface which is to be changed upon entry of a command by a user;

causing the appearance of said block of data to be changed upon entry of another command by said user;

replacing said one simulated interface with a modified simulated interface in said memory; and causing another simulated interface to be displayed on said display device upon entry of a command by said user.

8. An interactive computer program for simulating computer program external interfaces in a programmable digital computer, in which a plurality of simulated interfaces are to be stored in the memory of said digital computer and in which said simulated interfaces are intended to be selectively displayed on a display device associated with said digital computer in response to user inputs, said interactive computer program comprising:

means within said computer program for logically interconnecting said interfaces to permit the creation of an executable set of simulated computer program interfaces;

means within said computer program for causing a selected interface to be displayed on said display device upon the entry of a command by a user which initiates the execution of said set of simulated computer program interfaces;

means within said computer program for allowing a user to selectively modify the appearance of information on at least one simulated interface upon entry of a command by the user during execution of said set of simulated computer program interfaces; and means within said computer program for causing a modified simulated interface to be stored in the memory of said digital computer.

9. A computer program as in claim 8 further comprising:

means within said computer program for causing the logical interconnections among said simulated interfaces to be altered under the control of the user.

* * * * *